United States Patent
Banhidy et al.

(10) Patent No.: US 11,004,144 B2
(45) Date of Patent: May 11, 2021

(54) PRODUCT AND CONTRACTOR SERVICE MAPPING FOR COMPUTER-MEDIATED REALITY SYSTEMS

(71) Applicant: SERVICE TRADING COMPANY, INC., Irvine, CA (US)

(72) Inventors: Todd Banhidy, Orange, CA (US); David Pourjahan, Corona Del Mar, CA (US)

(73) Assignee: Service Trading Company, Inc., Irvine, CA (US)

( * ) Notice: Subject to any disclaimer, the term of this patent is extended or adjusted under 35 U.S.C. 154(b) by 0 days.

(21) Appl. No.: 16/628,007

(22) PCT Filed: Jan. 29, 2019

(86) PCT No.: PCT/US2019/015527
§ 371 (c)(1),
(2) Date: Dec. 31, 2019

(87) PCT Pub. No.: WO2019/148155
PCT Pub. Date: Aug. 1, 2019

(65) Prior Publication Data
US 2020/0226669 A1 Jul. 16, 2020

Related U.S. Application Data

(60) Provisional application No. 62/623,119, filed on Jan. 29, 2018.

(51) Int. Cl.
*G06Q 30/00* (2012.01)
*G06Q 30/06* (2012.01)
*G06T 19/00* (2011.01)

(52) U.S. Cl.
CPC ..... *G06Q 30/0643* (2013.01); *G06Q 30/0627* (2013.01); *G06T 19/006* (2013.01)

(58) Field of Classification Search
None
See application file for complete search history.

(56) References Cited

U.S. PATENT DOCUMENTS

| 9,361,616 B2 | 6/2016 | Zhou et al. |
| 2011/0078487 A1* | 3/2011 | Nielsen ................ G06Q 30/02 714/2 |

(Continued)

FOREIGN PATENT DOCUMENTS

| WO | 2011084720 A2 | 7/2011 |
| WO | 2013075071 A1 | 5/2013 |

OTHER PUBLICATIONS

Amazon AR View webpage, https://www.amazon.com/b?node=17403032011, Jan. 29, 2018.

(Continued)

*Primary Examiner* — Mila Airapetian
(74) *Attorney, Agent, or Firm* — Total Awareness Consulting Services; Robert Winslow

(57) ABSTRACT

A computer-mediated reality system electronically communicates computer-mediated presentation information for a product to a purchaser device. The computer-mediated reality system electronically receives a selection of the product. The computer-mediated reality system automatically places a product code for the product in an electronic shopping cart. The computer-mediated reality system electronically communicates computer-mediated offer information for a contractor service to the purchaser device. The computer-mediated reality system electronically receives a selection of the contractor service. The computer-mediated reality system automatically places a service code for the contractor service in the electronic shopping cart, the service code electronically received from a mapping computer system, the service code automatically derived by the mapping computing system programmed to map the product with the (Continued)

contractor service. The computer-mediated reality system electronically communicates electronic shopping cart information to the purchaser device with a request to complete a purchase of the product and the contractor service.

25 Claims, 8 Drawing Sheets

(56) References Cited

U.S. PATENT DOCUMENTS

| | | |
|---|---|---|
| 2013/0046648 A1 | 2/2013 | Calman et al. |
| 2013/0181045 A1 | 7/2013 | Dessert et al. |
| 2014/0100997 A1 | 4/2014 | Mayerle et al. |
| 2014/0244442 A1 | 8/2014 | Hirsch |
| 2016/0379297 A1 | 12/2016 | Aspholm |
| 2017/0103388 A1 | 4/2017 | Pillai et al. |
| 2017/0132841 A1 | 5/2017 | Morrison |
| 2018/0375960 A1 | 12/2018 | Greene et al. |
| 2019/0130462 A1* | 5/2019 | Tietzen .............. G06Q 30/0279 |

OTHER PUBLICATIONS

Build.com mobile application, https://itunes.apple.com/us/app/build-home-shopping-advice/id1053662668?mt=8, Oct. 26, 2017.
Houzz mobile application, https://www.houzz.com/ideabooks/92395032/list/try-out-products-in-your-room-with-houzzs-enhanced-ios-app, Oct. 26, 2017.
Overstock mobile application, https://www.overstock.com/apps, Oct. 26, 2017.
Wayfair mobile application, https://itunes.apple.com/us/app/wayfair-shop-furniture-home-decor-daily-sales/id8367677087mt=8, Oct. 26, 2017.

* cited by examiner

PRODUCT AND CONTRACTOR SERVICE MAPPING FOR COMPUTER-MEDIATED REALITY SYSTEMS

CROSS-REFERENCE TO RELATED APPLICATIONS

This application claims the benefit of U.S. Provisional Application No. 62/623,119, filed 29 Jan. 2018, which is hereby incorporated by reference in its entirety.

BACKGROUND

Many computer-mediated reality systems may be employed by e-commerce service providers to offer products for sale to purchasers. Many computer-mediated reality systems may be employed by purchasers to visualize product characteristics (for example, size, fit, color, and/or texture) prior to product purchase.

Many potential purchasers of products may hesitate purchasing products that may require a contractor service such as installation. Some contractors may not be certified. Finding a certified contractor may be difficult for some purchasers. Finding an available contractor may be difficult for some purchasers. Many potential purchasers may be concerned with being overcharged by contractors. Many contractors may be concerned about getting paid by purchasers after a contracted service has been completed for the purchasers. Many potential purchasers may be uncomfortable disclosing banking data directly to contractors.

Many e-commerce providers recognize that some potential product sales may be lost due to leaving the burden of finding a contractor to purchasers. A contractor may be desired to complete a contractor service related to a potential product purchase. Many e-commerce providers recognize the liability of recommending third-party contractors. Some e-commerce providers may hire and/or certify contractors directly. However, this may be a time-consuming process. Furthermore, a plurality of third-party contractors in a plurality of locations covering a plurality of contractor service types may be needed to cover a plurality of products offered for sale through a computer-mediated reality system available on a global network such as the Internet. Automated systems, stored programs, and methods are needed to map products to contractor services and communicate product and contractor service information to purchasers employing computer-mediated reality systems.

Many e-commerce providers realize that some potential sales may be lost if purchasers are not offered transactions that are easily understandable and immediate. Automated systems, stored programs, and methods are needed to improve e-commerce transactions for purchasers employing computer-mediated reality systems.

SUMMARY OF THE PRESENT DISCLOSURE

A computer-mediated reality system is coupled to a global computer network and is programmed to perform a method of selling a product with a contractor service associated with the product. The method performed by the computer-mediated reality system comprises electronically communicating to a purchaser device, from the computer-mediated reality system, computer-mediated presentation information for the product. The method performed by the computer-mediated reality system comprises electronically receiving at the computer-mediated reality system, from the purchaser device, a selection of the product. The method performed by the computer-mediated reality system comprises automatically placing a product code for the product in an electronic shopping cart. The method performed by the computer-mediated reality system comprises electronically communicating to the purchaser device, from the computer-mediated reality system, computer-mediated offer information for the contractor service. The method performed by the computer-mediated reality system comprises electronically receiving at the computer-mediated reality system, from the purchaser device, a selection of the contractor service. The method performed by the computer-mediated reality system comprises automatically placing a service code for the contractor service in the electronic shopping cart. The service code is electronically received at the computer-mediated reality system from a mapping computer system. The service code is automatically derived by the mapping computing system programmed to map the product with the contractor service. The method performed by the computer-mediated reality system comprises electronically communicating to the purchaser device, from the computer-mediated reality system, electronic shopping cart information with a request to complete a purchase of the product and the contractor service.

A computer-mediated reality system is programmed to perform a method of selling a product with a contractor service associated with the product. The method performed by the computer-mediated reality system comprises electronically communicating computer-mediated presentation information for the product. The method performed by the computer-mediated reality system comprises electronically receiving a selection of the product. The method performed by the computer-mediated reality system comprises automatically placing a product code for the product in an electronic shopping cart. The method performed by the computer-mediated reality system comprises electronically communicating computer-mediated offer information for the contractor service. The method performed by the computer-mediated reality system comprises electronically receiving a selection of the contractor service. The method performed by the computer-mediated reality system comprises automatically placing a service code for the contractor service in the electronic shopping cart. The method performed by the computer-mediated reality system comprises electronically communicating electronic shopping cart information with a request to complete a purchase of the product and the contractor service.

A computer-mediated reality system is coupled to a global computer network and is programmed to perform a method of selling a product with a contractor service associated with the product. The method performed by the computer-mediated reality system comprises electronically communicating to a purchaser device, from the computer-mediated reality system, computer-mediated presentation information for the product. The method performed by the computer-mediated reality system comprises electronically receiving at the computer-mediated reality system, from the purchaser device, a selection of the product. The method performed by the computer-mediated reality system comprises automatically placing a product code for the product in an electronic shopping cart. The method performed by the computer-mediated reality system comprises electronically communicating to a purchaser device, from the computer-mediated reality system, computer-mediated offer information for the contractor service. The method performed by the computer-mediated reality system comprises electronically receiving at the computer-mediated reality system, from the purchaser device, a selection of the contractor service. The method performed by the computer-mediated reality system comprises automatically placing a service code for the contractor service in the electronic shopping cart. The service code is electronically received at the computer-mediated reality system from a mapping computer system. The service code is automatically derived by the mapping computing system programmed to map the product with the contractor service. The method performed by the computer-mediated reality system comprises completing an electronic shopping cart transaction in electronic communication with the purchaser device.

A computer-mediated reality system is programmed to perform a method of selling a product with a contractor service associated with the product. The method performed by the computer-mediated reality system comprises electronically communicating computer-mediated presentation information for the product. The method performed by the computer-mediated reality system comprises electronically receiving a selection of the product. The method performed by the computer-mediated reality system comprises automatically placing a product code for the product in an electronic shopping cart. The method performed by the computer-mediated reality system comprises electronically communicating computer-mediated offer information for the contractor service. The method performed by the computer-mediated reality system comprises electronically receiving a selection of the contractor service. The method performed by the computer-mediated reality system comprises automatically placing a service code for the contractor service in the electronic shopping cart. The method performed by the computer-mediated reality system comprises completing an electronic shopping cart transaction.

A computer-mediated reality system is coupled to a global computer network and is programmed to perform a method of selling a product with a contractor service associated with the product. The method performed by the computer-mediated reality system comprises electronically communicating to a purchaser device, from the computer-mediated reality system, computer-mediated presentation information for the product and the contractor service. The method performed by the computer-mediated reality system comprises electronically receiving at the computer-mediated reality system, from the purchaser device, a selection of the product with the contractor service. The method performed by the computer-mediated reality system comprises automatically placing a product code for the product in an electronic shopping cart. The method performed by the computer-mediated reality system comprises automatically placing a service code for the contractor service in the electronic shopping cart. The service code is electronically received at the computer-mediated reality system from a mapping computer system. The service code is automatically derived by the mapping computing system programmed to map the product with the contractor service. The method performed by the computer-mediated reality system comprises electronically communicating to the purchaser device, from the computer-mediated reality system, electronic shopping cart information with a request to complete a purchase of the product and the contractor service.

A computer-mediated reality system is programmed to perform a method of selling a product with a contractor service associated with the product. The method performed by the computer-mediated reality system comprises electronically communicating computer-mediated presentation information for the product and the contractor service. The method performed by the computer-mediated reality system comprises electronically receiving a selection of the product with the contractor service. The method performed by the computer-mediated reality system comprises automatically placing a product code for the product in an electronic shopping cart. The method performed by the computer-mediated reality system comprises automatically placing a service code for the contractor service in the electronic shopping cart. The method performed by the computer-mediated reality system comprises electronically communicating electronic shopping cart information with a request to complete a purchase of the product and the contractor service.

A computer-mediated reality system is coupled to a global computer network and is programmed to perform a method of selling a product with a contractor service associated with the product. The method performed by the computer-mediated reality system comprises electronically communicating to a purchaser device, from the computer-mediated reality system, computer-mediated presentation information for the product and the contractor service. The method performed by the computer-mediated reality system comprises electronically receiving at the computer-mediated reality system, from the purchaser device, a selection of the product with the contractor service. The method performed by the computer-mediated reality system comprises automatically placing a product code for the product in an electronic shopping cart. The method performed by the computer-mediated reality system comprises automatically placing a service code for the contractor service in the electronic shopping cart. The service code is electronically received at the computer-mediated reality system from a mapping computer system. The service code is automatically derived by the mapping computing system programmed to map the product with the contractor service. The method performed by the computer-mediated reality system comprises completing an electronic shopping cart transaction in electronic communication with the purchaser device.

A computer-mediated reality system is programmed to perform a method of selling a product with a contractor service associated with the product. The method performed by the computer-mediated reality system comprises electronically communicating computer-mediated presentation information for the product and the contractor service. The method performed by the computer-mediated reality system comprises electronically receiving a selection of the product with the contractor service. The method performed by the computer-mediated reality system comprises automatically placing a product code for the product in an electronic shopping cart. The method performed by the computer-mediated reality system comprises automatically placing a service code for the contractor service in the electronic shopping cart. The method performed by the computer-mediated reality system comprises completing an electronic shopping cart transaction.

A tangible, non-transitory data storage medium comprises indicia of instructions for a computer-mediated reality system to perform an automated method of selling a product with a contractor service associated with the product. The computer-mediated reality system is coupled to a global computer network with access to a data storage device. The automated method performed according to the instructions comprises electronically communicating to a purchaser device, from the computer-mediated reality system, computer-mediated presentation information for the product. The automated method performed according to the instructions comprises electronically receiving at the computer-mediated reality system, from the purchaser device, a selection of the product. The automated method performed according to the instructions comprises automatically placing a product code for the product in an electronic shopping cart. The automated method performed according to the instructions comprises electronically communicating to the purchaser device, from the computer-mediated reality system, computer-mediated offer information for the contractor service. The automated method performed according to the instructions comprises electronically receiving at the computer-mediated reality system, from the purchaser device, a selection of the contractor service. The automated method performed according to the instructions comprises automatically placing a service code for the contractor service in the electronic shopping cart. The service code is electronically received at the computer-mediated reality system from a mapping computer system. The service code is automatically derived by the mapping computing system programmed to map the product with the contractor service. The automated method performed according to the instructions comprises electronically communicating to the purchaser device, from the computer-mediated reality system, electronic shopping cart information with a request to complete a purchase of the product and the contractor service.

A tangible, non-transitory data storage medium comprises indicia of instructions for a computer-mediated reality system to perform an automated method of selling a product with a contractor service associated with the product. The automated method performed according to the instructions comprises electronically communicating computer-mediated presentation information for the product. The automated method performed according to the instructions comprises electronically receiving a selection of the product. The automated method performed according to the instructions comprises automatically placing a product code for the product in an electronic shopping cart. The automated method performed according to the instructions comprises electronically communicating computer-mediated offer information for the contractor service. The automated method performed according to the instructions comprises electronically receiving a selection of the contractor service. The automated method performed according to the instructions comprises automatically placing a service code for the contractor service in the electronic shopping cart. The automated method performed according to the instructions comprises electronically communicating electronic shopping cart information with a request to complete a purchase of the product and the contractor service.

A tangible, non-transitory data storage medium comprises indicia of instructions for a computer-mediated reality system to perform an automated method of selling a product with a contractor service associated with the product. The computer-mediated reality system is coupled to a global computer network with access to a data storage device. The automated method performed according to the instructions comprises electronically communicating to a purchaser device, from the computer-mediated reality system, computer-mediated presentation information for the product. The automated method performed according to the instructions comprises electronically receiving at the computer-mediated reality system, from the purchaser device, a selection of the product. The automated method performed according to the instructions comprises automatically placing a product code for the product in an electronic shopping cart. The automated method performed according to the instructions comprises electronically communicating to a purchaser device, from the computer-mediated reality system, computer-mediated offer information for the contractor service. The automated method performed according to the instructions comprises electronically receiving at the computer-mediated reality system, from the purchaser device, a selection of the contractor service. The automated method performed according to the instructions comprises automatically placing a service code for the contractor service in the electronic shopping cart. The service code is electronically received at the computer-mediated reality system from a mapping computer system. The service code is automatically derived by the mapping computing system programmed to map the product with the contractor service. The automated method performed according to the instructions comprises completing an electronic shopping cart transaction in electronic communication with the purchaser device.

A tangible, non-transitory data storage medium comprises indicia of instructions for a computer-mediated reality system to perform an automated method of selling a product with a contractor service associated with the product. The automated method performed according to the instructions comprises electronically communicating computer-mediated presentation information for the product. The automated method performed according to the instructions comprises electronically receiving a selection of the product. The automated method performed according to the instructions comprises automatically placing a product code for the product in an electronic shopping cart. The automated method performed according to the instructions comprises electronically communicating computer-mediated offer information for the contractor service. The automated method performed according to the instructions comprises electronically receiving a selection of the contractor service. The automated method performed according to the instructions comprises automatically placing a service code for the contractor service in the electronic shopping cart. The automated method performed according to the instructions comprises completing an electronic shopping cart transaction.

A tangible, non-transitory data storage medium comprises indicia of instructions for a computer-mediated reality system to perform an automated method of selling a product with a contractor service associated with the product. The computer-mediated reality system is coupled to a global computer network with access to a data storage device. The automated method performed according to the instructions comprises electronically communicating to a purchaser device, from the computer-mediated reality system, computer-mediated presentation information for the product and the contractor service. The automated method performed according to the instructions comprises electronically receiving at the computer-mediated reality system, from the purchaser device, a selection of the product with the contractor service. The automated method performed according to the instructions comprises automatically placing a product code for the product in an electronic shopping cart. The automated method performed according to the instructions comprises automatically placing a service code for the contractor service in the electronic shopping cart. The service code is electronically received at the computer-mediated reality system from a mapping computer system. The service code is automatically derived by the mapping computing system programmed to map the product with the contractor service. The automated method performed according to the instructions comprises electronically communicating to the purchaser device, from the computer-mediated reality system, electronic shopping cart information with a request to complete a purchase of the product and the contractor service.

A tangible, non-transitory data storage medium comprises indicia of instructions for a computer-mediated reality system to perform an automated method of selling a product with a contractor service associated with the product. The automated method performed according to the instructions comprises electronically communicating computer-mediated presentation information for the product and the contractor service. The automated method performed according to the instructions comprises electronically receiving a selection of the product with the contractor service. The automated method performed according to the instructions comprises automatically placing a product code for the product in an electronic shopping cart. The automated method performed according to the instructions comprises automatically placing a service code for the contractor service in the electronic shopping cart. The automated method performed according to the instructions comprises electronically communicating electronic shopping cart information with a request to complete a purchase of the product and the contractor service.

A tangible, non-transitory data storage medium comprises indicia of instructions for a computer-mediated reality system to perform an automated method of selling a product with a contractor service associated with the product. The computer-mediated reality system is coupled to a global computer network with access to a data storage device. The automated method performed according to the instructions comprises electronically communicating to a purchaser device, from the computer-mediated reality system, computer-mediated presentation information for the product and the contractor service. The automated method performed according to the instructions comprises electronically receiving at the computer-mediated reality system, from the purchaser device, a selection of the product with the contractor service. The automated method performed according to the instructions comprises automatically placing a product code for the product in an electronic shopping cart. The automated method performed according to the instructions comprises automatically placing a service code for the contractor service in the electronic shopping cart. The service code is electronically received at the computer-mediated reality system from a mapping computer system. The service code is automatically derived by the mapping computing system programmed to map the product with the contractor service. The automated method performed according to the instructions comprises completing an electronic shopping cart transaction in electronic communication with the purchaser device.

A tangible, non-transitory data storage medium comprises indicia of instructions for a computer-mediated reality system to perform an automated method of selling a product with a contractor service associated with the product. The automated method performed according to the instructions comprises electronically communicating computer-mediated presentation information for the product and the contractor service. The automated method performed according to the instructions comprises electronically receiving a selection of the product with the contractor service. The automated method performed according to the instructions comprises automatically placing a product code for the product in an electronic shopping cart. The automated method performed according to the instructions comprises automatically placing a service code for the contractor service in the electronic shopping cart. The automated method performed according to the instructions comprises completing an electronic shopping cart transaction.

The selection of the product and the selection of the contractor service may be made through employment of at least one of: a camera, a biometric device, an EyeTap, a microphone, and a touchscreen.

The method performed by the computer-mediated reality system may comprise electronically communicating to the purchaser device, from the computer-mediated reality system, computer-mediated offer information for the product with the contractor service.

The selection of the product with the contractor service may be made through employment of at least one of: a camera, a biometric device, an EyeTap, a microphone, and a touchscreen.

The method performed by the computer-mediated reality system may comprise electronically completing the purchase through employment of a mobile payment system.

The method performed by the computer-mediated reality system may comprise electronically completing the electronic shopping cart transaction through employment of a mobile payment system.

The computer-mediated presentation information may comprise at least one of: an augmented reality presentation component, and a virtual reality presentation component.

The computer-mediated offer information may comprise at least one of: an augmented reality presentation component, and a virtual reality presentation component.

The method performed by the computer-mediated reality system may comprise electronically receiving image data captured by the purchaser device. The image data may comprise an item.

The method performed by the computer-mediated reality system may comprise automatically identifying a potential product from the image data.

The method performed by the computer-mediated reality system may comprise automatically correlating the potential product with the product.

The method performed by the computer-mediated reality system may comprise automatically retrieving the product code for the product.

The product code may represent at least one of: a product, a plurality of products, and a set of products.

At least one of the following may comprise a rental: a sale, and a purchase.

The contractor service may comprise at least one of: a measurement, assembly of the product, an installation, a delivery, an inspection, a repair, a replacement, a warranty certification, a repair under warranty, and a replacement under warranty.

The service code may correspond to a service price. The service price may be based on location data. The location data may be electronically communicated from the purchaser device.

The service code may correspond to a service price. The service price may be based on location information of a purchaser. The location information may be communicated to the computer-mediated reality system from a mobile payment system.

The method performed by the computer-mediated reality system may comprise electronically receiving purchaser data for a purchaser.

The method performed by the computer-mediated reality system may comprise electronically communicating first data to the purchaser device. The first data may indicate product data and contractor service data to a purchaser employing the purchaser device.

The method performed by the computer-mediated reality system may comprise electronically communicating second data to the purchaser device. The second data may indicate electronic shopping cart data to a purchaser employing the purchaser device.

The method performed by the computer-mediated reality system may comprise electronically communicating third data to the purchaser device. The third data may indicate terms of service to a purchaser employing the purchaser device.

The method performed by the computer-mediated reality system may comprise electronically communicating terms of service to a purchaser device. The method performed by the computer-mediated reality system may comprise electronically receiving an acceptance of the terms of service from the purchaser device. The method performed by the computer-mediated reality system may comprise electronically communicating the acceptance to a service processing computer system.

The method performed by the computer-mediated reality system may comprise automatically removing the service code from the electronic shopping cart based on an invalidation.

The method performed by the computer-mediated reality system may comprise electronically communicating an electronic service request to a service processing computer system. The electronic service request may comprise at least one of: purchaser data, product data, and service data.

The method performed by the computer-mediated reality system may comprise electronically communicating a service order confirmation to a purchaser device.

The method performed by the computer-mediated reality system may comprise electronically communicating a consumer feedback survey to a purchaser device.

The method performed by the computer-mediated reality system may comprise electronically receiving consumer feedback survey data from a purchaser device.

DETAILED DESCRIPTION OF EMBODIMENTS

At least some embodiments of the present disclosure communicate computer-mediated presentation information for a product to a purchaser device. At least some embodiments of the present disclosure may communicate computer-mediated offer information for a contractor service to a purchaser device. At least some embodiments of the present disclosure automatically place a product code and a service code in an electronic shopping cart. At least some embodiments of the present disclosure automatically map products with contractor services. At least some embodiments of the present disclosure automatically enable a purchase of a product(s) with a related contractor service(s). Aspects of embodiments include, but are not limited to: efficient purchasing of products and related contractor services; complete visualization of a future product purchase (for example, an appliance) after a future contractor service has been completed (for example, an installation); effective advertising of products and services for purchasers employing computer-mediated reality systems, programs, and methods; and/or an offering of products that may require contractor services for sellers employing computer-mediated reality systems, programs, and methods.

Figure 1:
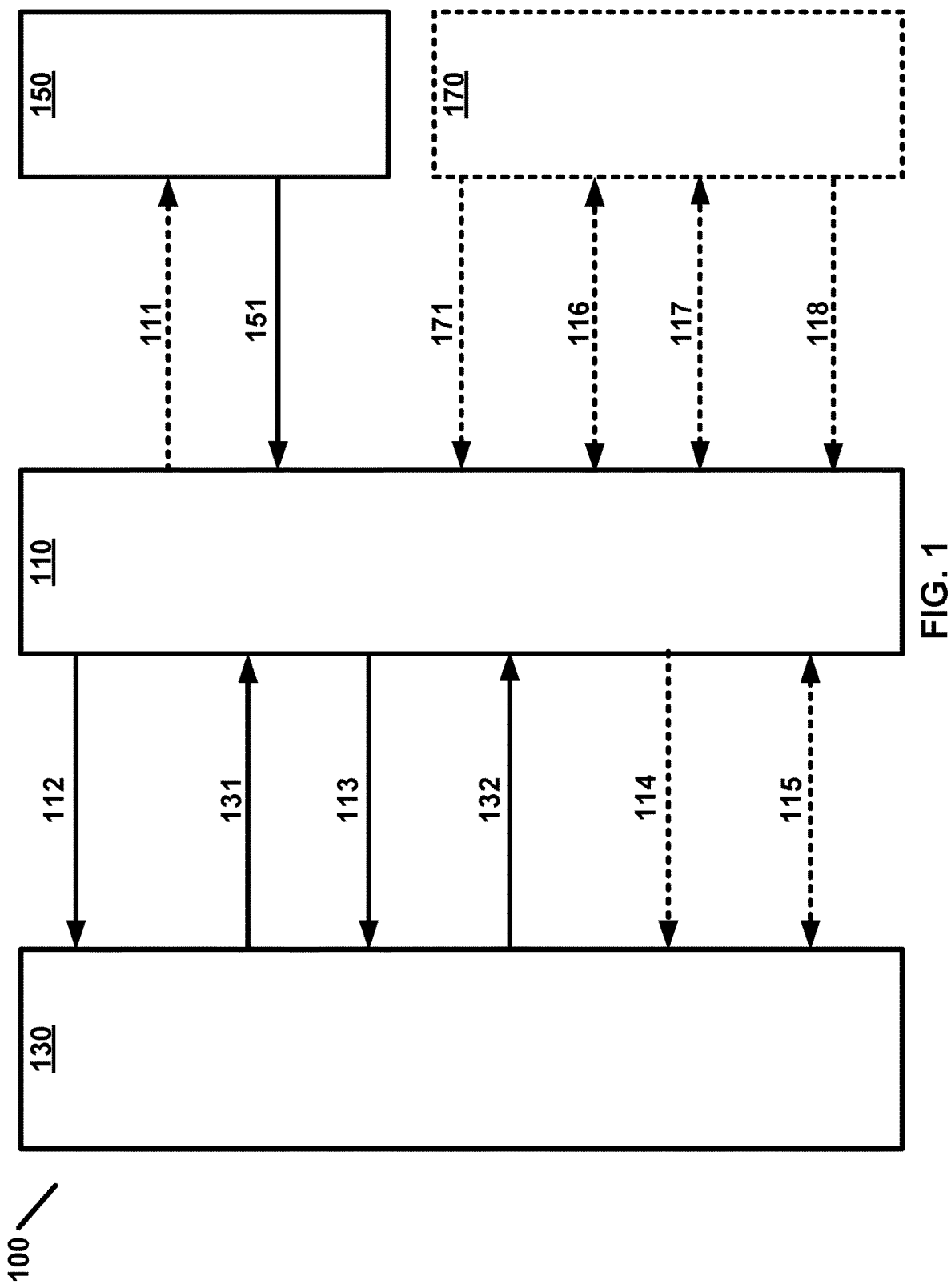
FIG. 1 is a block diagram showing an example computer-mediated reality network as per an aspect of various embodiments.

FIG. 1 is a block diagram showing an example computer-mediated reality network 100 as per an aspect of various embodiments. Computer-mediated reality network 100 may comprise computer-mediated reality system 110, purchaser device 130, and mapping computer system 150. Computer-mediated reality system 110, purchaser device 130, and mapping computer system 150 may communicate through employment of a global computer network (for example, the Internet). Communication through employment of the global computer network may further employ an application, website, digital portal, Application Programming Interface (API), electronic message, digital file, combinations thereof, and/or the like.

According to an embodiment, computer-mediated reality system 110 may be programmed to sell a product with a contractor service associated with the product. Computer-mediated reality system 110 may be programmed to communicate a plurality of product codes 111 to mapping computer system 150. Mapping computer system 150 may be programmed to search computer-mediated reality system 110 for the plurality of product codes 111. For example, mapping computer system 150 may be programmed to search computer-mediated presentation information 112 accessible by computer-mediated reality system 110. Computer-mediated presentation information 112 may comprise instructions configured to present data associated with a product. Each of the plurality of product codes 111 may represent a product for sale, a plurality of products for sale, a set of products for sale, combinations thereof, and/or the like. A sale may comprise a rental of: a product, a plurality of products, a set of products, combinations thereof, and/or the like. A rental may comprise a lease.

According to an embodiment, computer-mediated presentation information 112 may comprise an augmented reality presentation component and/or a virtual reality presentation component. Computer-mediated presentation information 112 may be configured to be: presented visually on a display in communication with purchaser device 130, visually through at least one virtual retina display or EyeTap in communication with purchaser device 130, audibly through at least one speaker in communication with purchaser device 130, kinesthetically through at least one haptic interface in communication with purchaser device 130, combinations thereof, and/or the like. A display may comprise: a monitor, a touchscreen, a head mounted display, at least one bionic contact lens, at least one eyeglass, a head-up display (HUD), combinations thereof, and/or the like.

According to an embodiment, mapping computer system 150 may be programmed to map a product code 111 to a service code 151. Computer-mediated reality system 110 may be programmed to receive service code 151 from mapping computer system 150. Service code 151 may be mapped to product code 111. Product code 111 may be associated with a product, a plurality of products, or a set of products. Service code 151 may be based on a contractor service, a plurality of contractor services, or a set of contractor services.

According to an embodiment, a contractor service may be based on: product data (for example, data comprising a type of product and/or specifics about a product), a desired measurement, a desired assembly, an desired installation, a desired delivery, an desired inspection, a desired repair, a desired replacement, a desired warranty certification, a desired task, a non-task, combinations thereof, and/or the like. The contractor service may be configured to be performed by a third-party contractor. A service code may be based on location information 171 electronically communicated from mobile payment system 170 and/or purchaser data 118 electronically communicated from mobile payment system 170. Location information 171 may be based on a location of purchaser device 130. Location information 171 may be based on an address associated with a purchaser employing purchaser device 130. Purchaser data 118 may be based on information associated with the purchaser employing purchaser device 130. A service code 151 may relate to a service price. The service price may be based on location information 171 and/or purchaser data 118. Location information 171 and/or purchaser data 118 may be retrieved from a data storage device in communication with mobile payment system 170. The data storage device may be configured to store shopper account information. Shopper account information may comprise a method of payment. Examples of a method of payment include: a credit card, a debit card, Apple Pay, Android Pay, Pay with Google, Samsung Pay, MasterCard MasterPass, Visa Checkout, Venmo, a cryptocurrency, a merchant credit, a merchant loyalty program, Layar payment hooks to PayPal, combinations thereof, and/or the like. The service price may be based on the contractor service. The service price may be based on a contract with a certified contractor.

According to an embodiment, computer-mediated reality system 110 may be programmed to electronically communicate computer-mediated presentation information 112 to purchaser device 130. Computer-mediated presentation information 112 may be for: a product, a plurality of products, a set of products, combinations thereof, and/or the like. Computer-mediated presentation information 112 may be configured for presentation on purchaser device 130 through employment of: a widget, an application, a script, a plug-in to an application, a URL, an API, combinations thereof, and/or the like. Computer-mediated presentation information 112 may comprise a description. The description may be based on: a product, a plurality of products, a set of products, combinations thereof, and/or the like. The description may be based on a price of: a product, a plurality of products, a set of products, combinations thereof, and/or the like. The description may be based on a product code 111. Computer-mediated presentation information 112 may be communicated to purchaser device 130 after an electronic validation procedure is automatically executed. The electronic validation procedure may be configured to validate a user, a location, billing data, combinations thereof, and/or the like.

According to an embodiment, computer-mediated reality system 110 may be programmed to electronically receive a selection of a product 131 from purchaser device 130. The selection of a product 131 from purchaser device 130 may be made through employment of: a camera, a biometric device, an EyeTap, a microphone, a touchscreen, combinations thereof, and/or the like. A camera may be employed to recognize at least one physical gesture of a user of purchaser device 130. A biometric device may be employed to authenticate a user or an action by the user of purchaser device 130. An EyeTap may be employed to recognize at least one eye gesture of a user of purchaser device 130. A microphone may be employed to recognize at least one spoken command by a user of purchaser device 130. A touchscreen may be employed to recognize at least one touch input by a user of purchaser device 130.

According to an embodiment, computer-mediated reality system 110 may be programmed to create an electronic shopping cart for a purchaser employing purchaser device 130. Computer-mediated reality system 110 may be programmed to automatically place a product code 111 for a product in an electronic shopping cart.

According to an embodiment, computer-mediated reality system 110 may be programmed to electronically communicate computer-mediated offer information 113 to purchaser device 130. Computer-mediated offer information 113 may be for a contractor service. The contractor service may be associated with a product. Computer-mediated offer information 113 may comprise instructions to present information on one or more offers. Computer-mediated offer information 113 may comprise instructions to present information in a popup, in a distinct color, in a distinct location in a field of view, with a distinct sound, combinations thereof, and/or the like. Computer-mediated offer information 113 may be configured for presentation on purchaser device 130 through employment of: a widget, an application, a script, a plug-in to an application, a URL, an API, combinations thereof, and/or the like. Computer-mediated offer information 113 may comprise a description. The description may be based on a contractor service. The description may be based on a price of a contractor service. The description may be based on a service code 151. Computer-mediated offer information 113 may be communicated to purchaser device 130 after an electronic validation procedure is automatically executed. The electronic validation procedure may be configured to validate: a user, a location, billing data, combinations thereof, and/or the like. A contractor service may comprise: a measurement, assembly of a product, an installation, a delivery, an inspection, a repair, a replacement, a warranty certification, a repair under warranty, a replacement under warranty, combinations thereof, and/or the like. Examples of a replacement include: replacement of a smartphone display, and replacement of a furnace filter.

According to an embodiment, computer-mediated offer information 113 may comprise an augmented reality presentation component and/or a virtual reality presentation component. Computer-mediated offer information 113 may be configured to be presented: visually on a display in communication with purchaser device 130, visually through at least one virtual retina display or EyeTap in communication with purchaser device 130, audibly through at least one speaker in communication with purchaser device 130, kinesthetically through at least one haptic interface in communication with purchaser device 130, combinations thereof, and/or the like.

According to an embodiment, computer-mediated reality system 110 may be programmed to electronically receive a selection of a contractor service 132 from purchaser device 130. The selection of a contractor service 132 from purchaser device 130 may be made through employment of: a camera, a biometric device, an EyeTap, a microphone, a touchscreen, combinations thereof, and/or the like.

According to an embodiment, computer-mediated reality system 110 may be programmed to automatically place a service code 151 for a contractor service in an electronic shopping cart. Service code 151 may be electronically received at computer-mediated reality system 110 from mapping computer system 150. Service code 151 may be automatically derived by mapping computing system 150.

According to an embodiment, computer-mediated reality system 110 may be programmed to electronically communicate electronic shopping cart information 114 to purchaser device 130. Electronic shopping cart information 114 may be configured for presentation on purchaser device 130 through employment of: a widget, an application, a script, a plug-in to an application, a URL, an API, combinations thereof, and/or the like. Electronic shopping cart information 114 may be communicated with a request to complete a purchase of a product and a contractor service. The request may be configured for presentation on purchaser device 130 through employment of: a widget, an application, a script, a plug-in to an application, a URL, an API, combinations thereof, and/or the like. Computer-mediated reality system 110 may be programmed to electronically complete purchase 116 through employment of a mobile payment system 170. Purchase 116 may comprise a rental.

According to an embodiment, computer-mediated reality system 110 may be programmed to complete an electronic shopping cart transaction 115 in electronic communication with purchaser device 130. Shopping cart transaction 115 may be electronically completed automatically. Shopping cart transaction 117 may be electronically completed through employment of a mobile payment system 170. Purchaser device 130 may be programmed to complete shopping cart transaction 115 with computer-mediated reality system 110. Shopping cart transaction 115 may comprise a single transaction.

Figure 2:
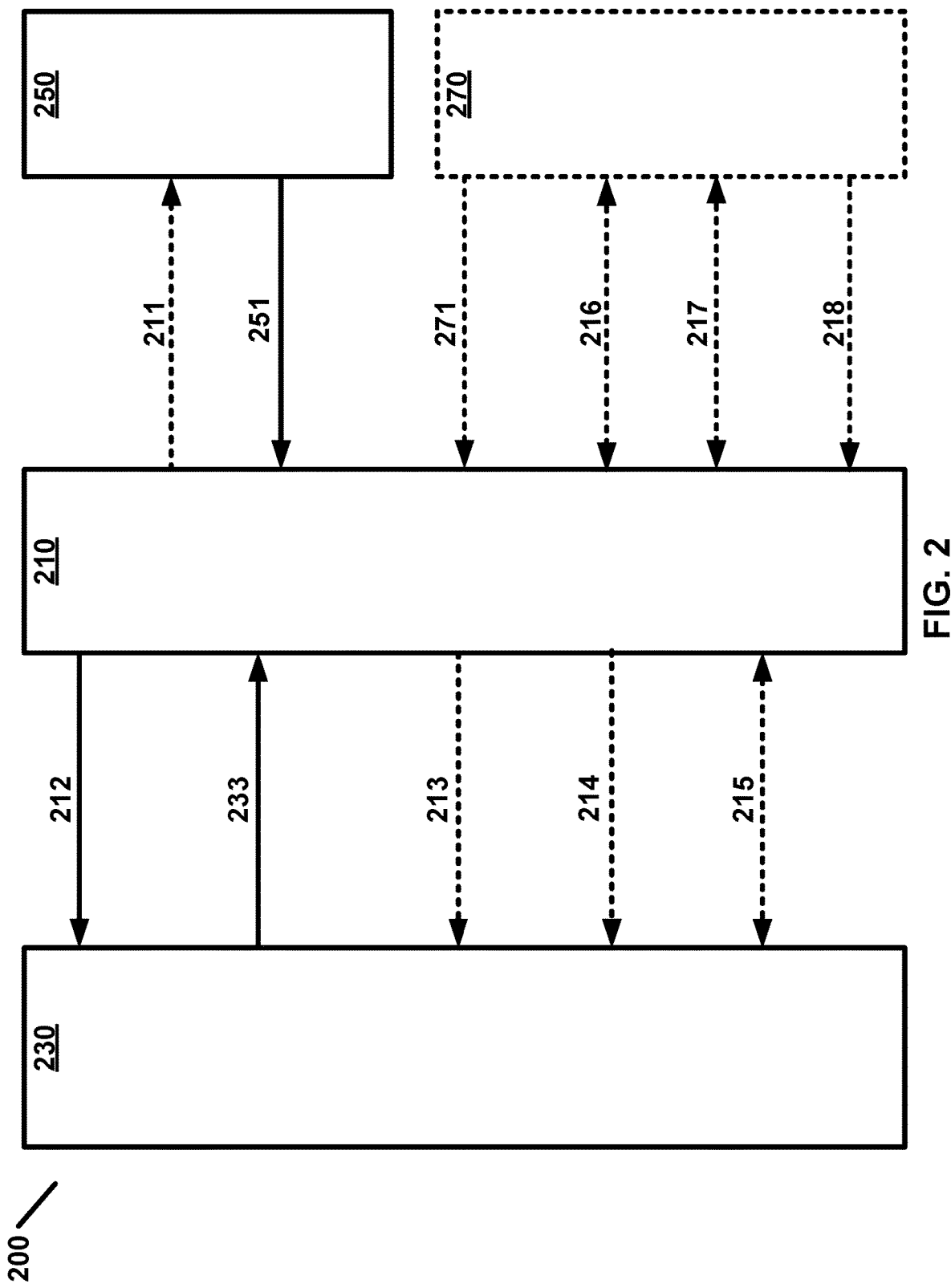
FIG. 2 is a block diagram showing an example computer-mediated reality network as per an aspect of various embodiments.

FIG. 2 is a block diagram showing an example computer-mediated reality network 200 as per an aspect of various embodiments. Computer-mediated reality network 200 may comprise computer-mediated reality system 210, purchaser device 230, and mapping computer system 250. Computer-mediated reality system 210, purchaser device 230, and mapping computer system 250 may communicate through employment of a global computer network (for example, the Internet). Communication through employment of the global computer network may further employ: an application, website, digital portal, Application Programming Interface (API), electronic message, digital file, combinations thereof, and/or the like.

According to an embodiment, computer-mediated reality system 210 may be programmed to sell a product with a contractor service associated with the product. Computer-mediated reality system 210 may be programmed to communicate a plurality of product codes 211 to mapping computer system 250. Mapping computer system 250 may be programmed to search computer-mediated reality system 210 for the plurality of product codes 211. For example, mapping computer system 250 may be programmed to search computer-mediated presentation information 212 accessible by computer-mediated reality system 210. Computer-mediated presentation information 212 may comprise instructions configured to present data associated with a product and a contractor service. Each of the plurality of product codes 211 may represent: a product for sale, a plurality of products for sale, a set of products for sale, combinations thereof, and/or the like.

According to an embodiment, mapping computer system 250 may be programmed to map a product code 211 to a service code 251. Computer-mediated reality system 210 may be programmed to receive service code 251 from mapping computer system 250. Service code 251 may be mapped to product code 211. Product code 211 may be associated with: a product, a plurality of products, or a set of products. Service code 251 may be based on: a contractor service, a plurality of contractor services, or a set of contractor services.

According to an embodiment, a service code may be based on location information 271 electronically communicated from mobile payment system 270 and/or purchaser data 218 electronically communicated from mobile payment system 270. A service code 251 may relate to a service price. The service price may be based on location information 271 and/or purchaser data 218. Location information 271 may be based on a location of purchaser device 230 or a purchaser employing purchaser device 230. Purchaser data 218 may be based on information associated with the purchaser employing purchaser device 230. Location information 271 and/or purchaser data 218 may be retrieved from a data storage device in communication with mobile payment system 270. The service price may be based on a contractor service. The service price may be based on a contract with a certified contractor.

According to an embodiment, computer-mediated reality system 210 may be programmed to electronically communicate computer-mediated presentation information 212 to purchaser device 230. Computer-mediated presentation information 212 may be for a product and a contractor service. Computer-mediated presentation information 212 may be for: a product, a plurality of products, a set of products, a contractor service, a plurality of contractor services, a set of contractor services, combinations thereof, and/or the like. Computer-mediated presentation information 212 may be configured for presentation on purchaser device 230 through employment of: a widget, an application, a script, a plug-in to an application, a URL, an API, combinations thereof, and/or the like. Computer-mediated presentation information 212 may comprise a description. The description may be based on: a product, a plurality of products, a set of products, a contractor service, a plurality of contractor services, or a set of contractor services, combinations thereof, and/or the like. The description may be based on a price of: a product, a plurality of products, a set of products, a contractor service, a plurality of contractor services, or a set of contractor services, combinations thereof, and/or the like. The description may be based on a product code 211 and/or a service code 251. Computer-mediated presentation information 212 may be communicated to purchaser device 230 after an electronic validation procedure is automatically executed. The electronic validation procedure may be configured to validate: a user, a location, billing data, combinations thereof, and/or the like.

According to an embodiment, computer-mediated reality system 210 may be programmed to electronically receive a selection of a product with a contractor service 233 from purchaser device 230. The selection of a product with a contractor service 233 from purchaser device 230 may be made through employment of: a camera, a biometric device, an EyeTap, a microphone, a touchscreen, combinations thereof, and/or the like. A camera may be employed to recognize at least one physical gesture of a user of purchaser device 230. A biometric device may be employed to authenticate a user or an action by the user of purchaser device 230. An EyeTap may be employed to recognize at least one eye gesture of a user of purchaser device 230. A microphone may be employed to recognize at least one spoken command by a user of purchaser device 230. A touchscreen may be employed to recognize at least one touch input by a user of purchaser device 230.

According to an embodiment, computer-mediated reality system 210 may be programmed to create an electronic shopping cart for a purchaser employing purchaser device 230. Computer-mediated reality system 210 may be programmed to automatically place a product code 211 for a product in the electronic shopping cart. Computer-mediated reality system 210 may be programmed to automatically place a service code 251 for a contractor service in the electronic shopping cart. Service code 251 may be electronically received at computer-mediated reality system 210 from mapping computer system 250. Service code 251 may be automatically derived by mapping computing system 250. Product code 211 and service code 251 may be placed in the electronic shopping cart simultaneously (or near simultaneously). Computer-mediated reality system 210 may be programmed to create the electronic shopping cart comprising product code 211 and service code 251. A combination code may represent product code 211 and service code 251. Computer-mediated reality system 210 may be programmed to place the combination code in the electronic shopping cart. Computer-mediated reality system 210 may be programmed to create the electronic shopping cart comprising the combination code. The electronic shopping cart may be presented through employment of: a widget, application, script, plug-in to an application, URL, API, combinations thereof, and/or the like.

According to an embodiment, computer-mediated reality system 210 may be programmed to electronically communicate computer-mediated offer information 213 to purchaser device 230. Computer-mediated offer information 213 may be for a product with a contractor service. The contractor service may be associated with the product. Computer-mediated offer information 213 may comprise instructions to present information on one or more offers. Computer-mediated offer information 213 may comprise instructions to present information: in a popup, in a distinct color, in a distinct location in a field of view, with a distinct sound, combinations thereof, and/or the like. Computer-mediated offer information 213 may be configured for presentation on purchaser device 230 through employment of: a widget, an application, a script, a plug-in to an application, a URL, an API, combinations thereof, and/or the like. Computer-mediated offer information 213 may comprise a description. The description may be based on a product and/or a contractor service. The description may be based on a price of a product and/or a contractor service. The description may be based on a product code 211 and/or a service code 251. Computer-mediated offer information 213 may be communicated to purchaser device 230 after an electronic validation procedure is automatically executed.

According to an embodiment, computer-mediated reality system 210 may be programmed to electronically communicate electronic shopping cart information 214 to purchaser device 230. Electronic shopping cart information 214 may be configured for presentation on purchaser device 230 through employment of: a widget, an application, a script, a plug-in to an application, a URL, an API, combinations thereof, and/or the like. Electronic shopping cart information 214 may be communicated with a request to complete a purchase of a product and a contractor service. The request may be configured for presentation on purchaser device 230 through employment of: a widget, an application, a script, a plug-in to an application, a URL, an API, combinations thereof, and/or the like. Computer-mediated reality system 210 may be programmed to electronically complete purchase 216 through employment of a mobile payment system 170.

According to an embodiment, computer-mediated reality system 210 may be programmed to complete an electronic shopping cart transaction 215 in electronic communication with purchaser device 230. Shopping cart transaction 215 may be electronically completed automatically. The shopping cart transaction 217 may be electronically completed through employment of a mobile payment system 270. The purchaser device 230 may be programmed to complete the shopping cart transaction with computer-mediated reality system 210. The shopping cart transaction may comprise a single transaction.

Figure 3:
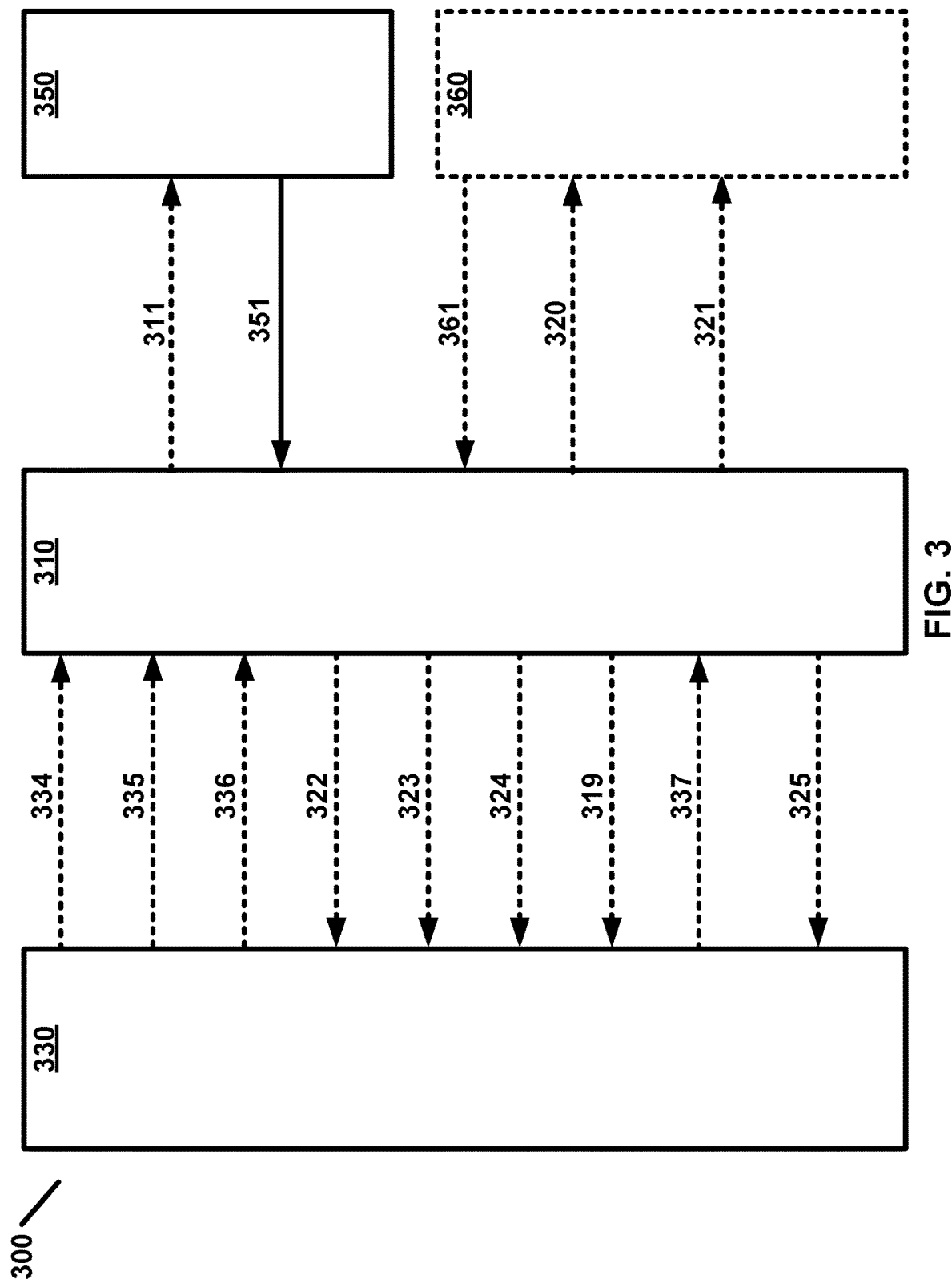
FIG. 3 is a block diagram showing an example computer-mediated reality network as per an aspect of various embodiments.

FIG. 3 is a block diagram showing an example computer-mediated reality network 300 as per an aspect of various embodiments. Computer-mediated reality network 300 may comprise: computer-mediated reality system 310, purchaser device 330, and mapping computer system 350. Computer-mediated reality system 310, purchaser device 330, and mapping computer system 350 may communicate through employment of a global computer network (for example, the Internet). Communication through employment of the global computer network may further employ: an application, website, digital portal, Application Programming Interface (API), electronic message, digital file, combinations thereof, and/or the like.

According to an embodiment, computer-mediated reality system 310 may be programmed to electronically receive image data 334 captured by purchaser device 330. Image data 334 may comprise an item. An item may comprise information desired for a contractor service. An item may, for example, comprise: a location for a product installation, an area surrounding a location for a product installation, an appliance in need of repair, a component in need of replacement, an electrical outlet, a gas pipe, a water outlet, a drain pipe, a path from a door or driveway to a location for a product installation, a product under warranty, combinations thereof, and/or the like. Computer-mediated reality system 310 may be programmed to automatically identify a potential product from image data 334. For example, a purchaser employing the purchaser device 330 may capture image data 334 comprising a potential product (for example, an appliance) on display (for example, in a retail location) or installed elsewhere (for example, in a residence or business). According to the embodiment, computer-mediated reality system 310 may be programmed to automatically correlate the potential product with a product. Computer-mediated reality system 310 may be programmed to automatically retrieve product code 311 for the product. Product code 311 may be retrieved from a data storage device in communication with computer-mediated reality system 310 or from mapping computer system 350.

According to an embodiment, computer-mediated reality system 310 may be programmed to electronically receive purchaser data 336 for a purchaser. Service code 351 may be based on location data 335 and/or purchaser data 336. Location data 335 and/or purchaser data 336 may be electronically communicated from purchaser device 330. The purchaser may be a user associated with purchaser device 330. A location of purchaser device 330 may be determined at least in part through employment of: a browser setting, an IP address, GPS position data, a Wi-Fi network, combinations thereof, and/or the like. Service code 351 may relate to a service price. The service price may be based on location data 335 and/or purchaser data 336. The service price may be based on a contractor service. The service price may be based on a contract with a certified contractor.

According to an embodiment, computer-mediated reality system 310 may be programmed to electronically communicate first data 322 to purchaser device 330. First data 322 may indicate product data and contractor service data to a purchaser employing purchaser device 330. The product data and contractor service data may be configured for presentation to the purchaser.

According to an embodiment, computer-mediated reality system 310 may be programmed to electronically communicate second data 323 to purchaser device 330. Second data 323 may indicate electronic shopping cart data to a purchaser employing purchaser device 330. The shopping cart data may comprise a product code 311 and service code 351.

According to an embodiment, computer-mediated reality system 310 may be programmed to electronically communicate third data 324 to purchaser device 330. Third data 324 may indicate terms of service data to a purchaser employing purchaser device 330. The terms of service data may be based on purchaser data 336.

According to an embodiment, computer-mediated reality system 310 may be programmed to receive terms of service 361 from service processing computer system 360. Computer-mediated reality system 310 may be programmed to electronically communicate terms of service 319 to purchaser device 330. Computer-mediated reality system 310 may be programmed to electronically receive acceptance of terms of service 337 from purchaser device 330. Computer-mediated reality system 310 may be programmed to electronically communicate acceptance of terms of service 320 to service processing computer system 360. Service processing computer system 360 may be the same as mapping computer system 350. Service processing computer system 360 may be integrated with mapping computer system 350. Acceptance of terms of service 337 may be communicated directly from purchaser device 330 to service processing computer system 360.

According to an embodiment, computer-mediated reality system 310 may be programmed to communicate electronic service request 321 to service processing computer system 360. Electronic service request 321 may comprise: purchaser data 336, product data, service data, combinations thereof, and/or the like. Examples of purchaser data 336 include a phone number for a purchaser and an email address for the purchaser. Product data may comprise a product code 311. Service data may comprise: a service code 351, installation instructions provided by a manufacturer, assembly instructions, delivery instructions, warranty information, combinations thereof, and/or the like. Electronic service request 321 may be based on a purchase of a product with a contractor service. Electronic service request 321 may comprise service data for a contractor service. Electronic service request 321 may comprise service code 351.

According to an embodiment, computer-mediated reality system 310 may be programmed to automatically remove a service code 351 from an electronic shopping cart based on an invalidation. The invalidation may be based on: a shipping address, billing address, and/or contact address. The shipping address, billing address, and/or contact address may be communicated by purchaser device 330. The shipping address, billing address, and/or contact address may be stored in an account associated with a purchaser employing purchaser device 330. The account may be accessible by computer-mediated reality system 210 and/or mobile payment system 270.

According to an embodiment, computer-mediated reality system 310 may be programmed to electronically communicate service order confirmation 325 to purchaser device 330. Service order confirmation 325 may originate from computer-mediated reality system 310, mapping computer system 350, and/or service processing computer system 360. Service order confirmation 325 may be communicated directly from service processing computer system 360 to purchaser device 330.

According to an embodiment, computer-mediated reality system 310 may be programmed to electronically communicate a consumer feedback survey to purchaser device 330. The consumer feedback survey may originate from: computer-mediated reality system 310, mapping computer system 350, and/or service processing computer system 360. The consumer feedback survey may be communicated directly from service processing computer system 360 to purchaser device 330. Computer-mediated reality system 310 may be programmed to electronically receive consumer feedback survey data from purchaser device 330. Computer-mediated reality system 310 may be programmed to communicate the consumer feedback survey data to mapping computer system 350, and/or service processing computer system 360. The consumer feedback survey data may be communicated directly from purchaser device 330 to service processing computer system 360.

Figure 4:
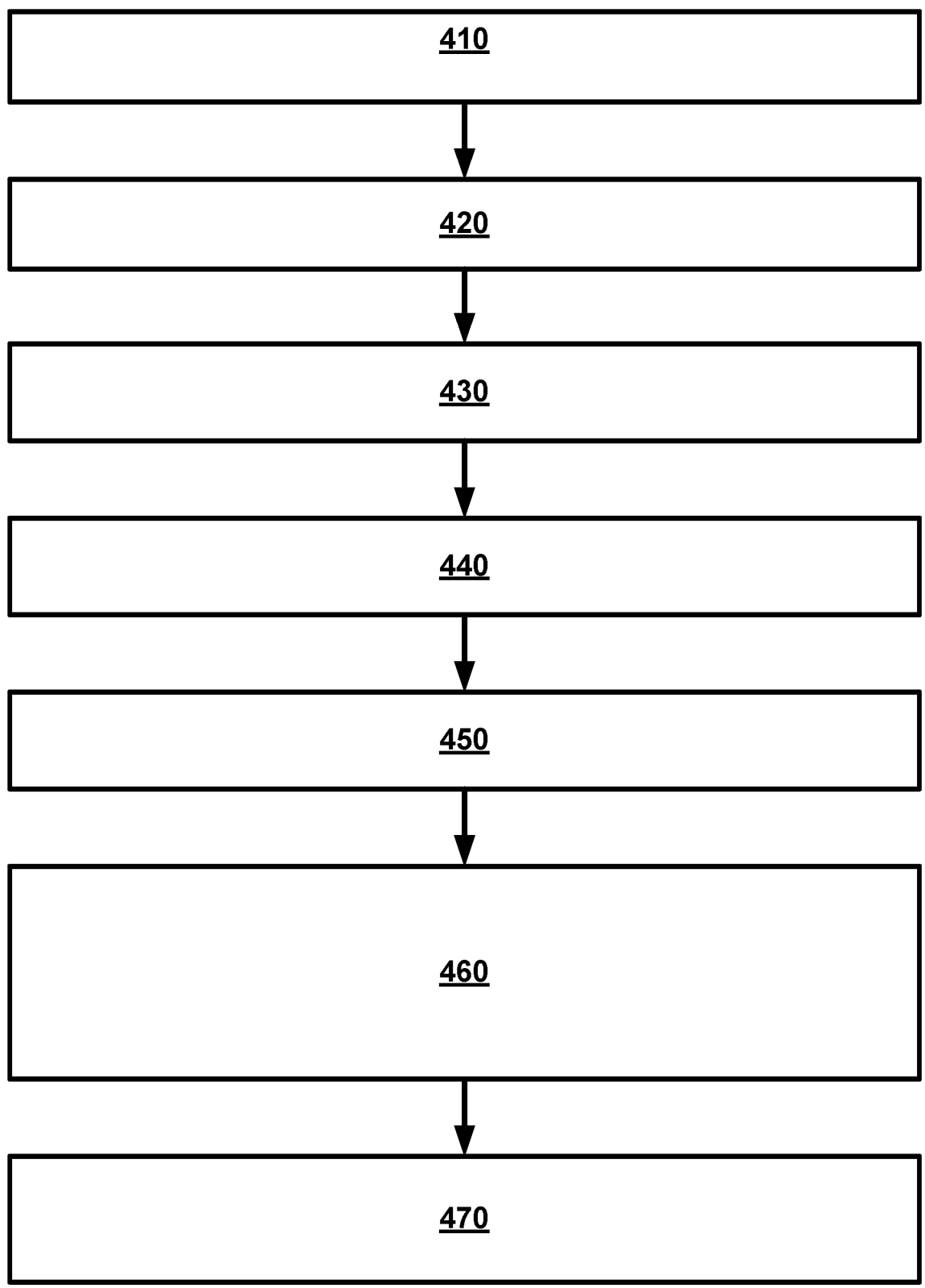
FIG. 4 is an example flow diagram of placing a product code and a service code in an electronic shopping cart as per an aspect of an embodiment.

FIG. 4 is an example flow diagram of placing a product code and a service code in an electronic shopping cart as per an aspect of an embodiment. A computer-mediated reality system (for example, 110) may be programmed to perform an automated method of selling a product with a contractor service. The contractor service may be associated with the product. The contractor service may be intended to be performed by a third-party contractor. The computer-mediated reality system (for example, 110) may be coupled to a global computer network with access to a data storage device. The automated method performed by the computer-mediated reality system (for example, 110) may comprise electronically communicating to a purchaser device (for example, 130), from the computer-mediated reality system (for example, 110), computer-mediated presentation information (for example, 112) for the product at 410. The automated method performed by the computer-mediated reality system (for example, 110) may comprise electronically receiving at the computer-mediated reality system (for example, 110), from the purchaser device (for example, 130), a selection of the product (for example, 131) at 420. The automated method performed by the computer-mediated reality system (for example, 110) may comprise determining that a selection of the product (for example, 131) has been received. The automated method performed by the computer-mediated reality system (for example, 110) may comprise automatically placing a product code (for example, 111) for the product in an electronic shopping cart at 430. The automated method performed by the computer-mediated reality system (for example, 110) may comprise electronically communicating to the purchaser device (for example, 130), from the computer-mediated reality system (for example, 110), computer-mediated offer information (for example, 113) for the contractor service at 440. The automated method performed by the computer-mediated reality system (for example, 110) may comprise electronically receiving at the computer-mediated reality system (for example, 110), from the purchaser device (for example, 130), a selection of the contractor service (for example, 132) at 450. The automated method performed by the computer-mediated reality system (for example, 110) may comprise determining that a selection of the contractor service (for example, 132) has been received. The automated method performed by the computer-mediated reality system (for example, 110) may comprise automatically placing a service code (for example, 151) for the contractor service in the electronic shopping cart, the service code (for example, 151) electronically received at the computer-mediated reality system (for example, 110) from a mapping computer system (for example, 150), the service code (for example, 151) automatically derived by the mapping computing system (for example, 150) programmed to map the product with the contractor service at 460. The automated method performed by the computer-mediated reality system (for example, 110) may comprise electronically communicating to the purchaser device (for example, 130), from the computer-mediated reality system (for example, 110), electronic shopping cart information (for example, 114) with a request to complete a purchase of the product and the contractor service at 470.

According to an embodiment, a service code (for example, 151) may be based on a product code (for example, 111) and/or product data related to a product. The service code (for example, 151) may be received from a mapping computer system (for example, 150) prior to receiving a selection of the contractor service (for example, 132). For example, a plurality of service codes (for example, 151) may be mapped to a plurality of product codes (for example, 111) for a plurality of products with contractor services communicated from the mapping computer system (for example, 150). The service code (for example, 151) may be received on demand from the mapping computer system (for example, 150) after receiving the selection of the contractor service (for example, 132). For example, an automated method performed by a computer-mediated reality system (for example, 110) may comprise requesting, on demand, a service code (for example, 151) for a specific product code (for example, 111) from the mapping computer system (for example, 150). The automated method performed by the computer-mediated reality system (for example, 110) may, for example, comprise downloading, on demand, a service code (for example, 151) for a specific product code (for example, 111) from the mapping computer system (for example, 150).

Figure 5:
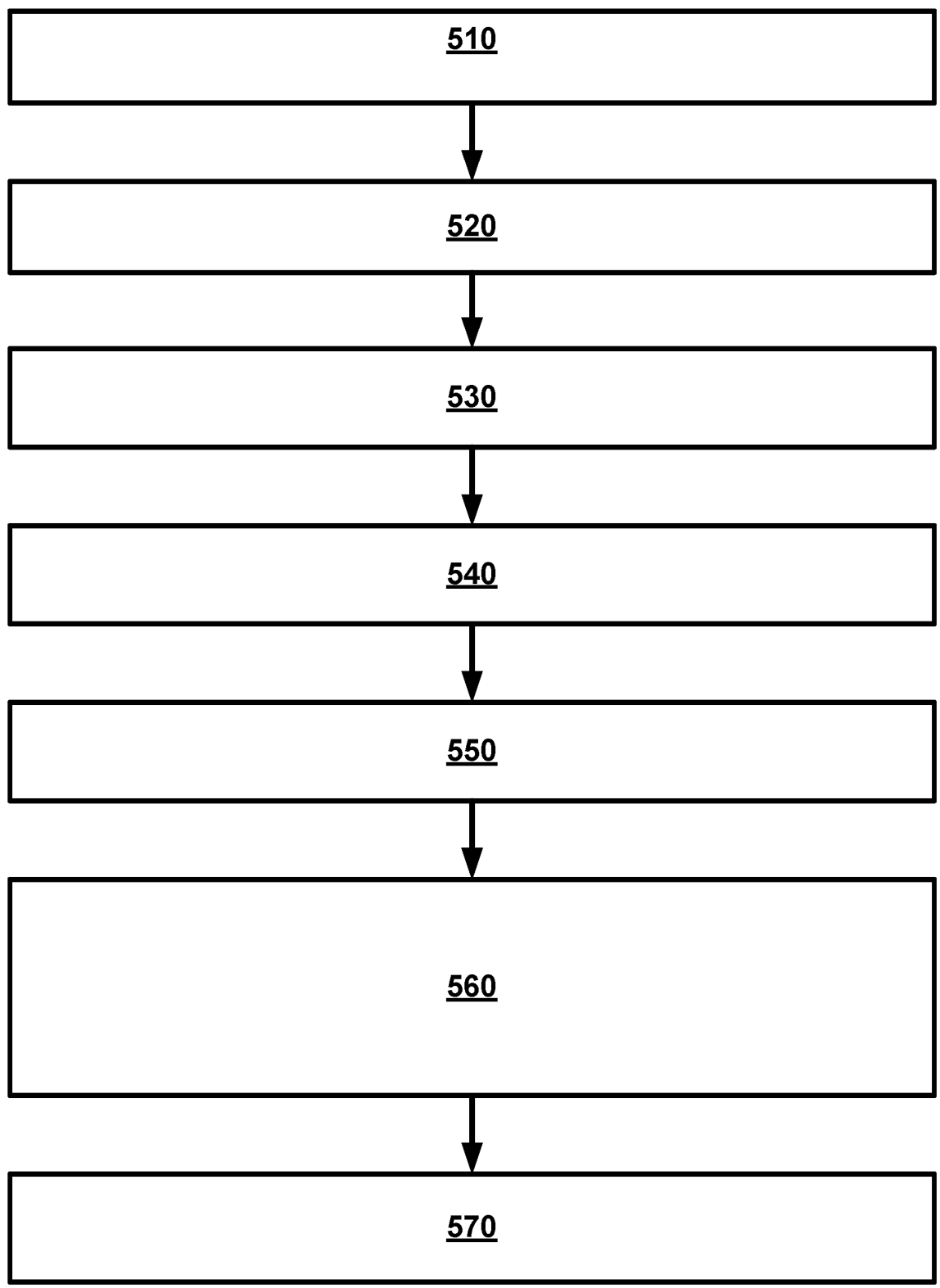
FIG. 5 is an example flow diagram of placing a product code and a service code in an electronic shopping cart as per an aspect of an embodiment.

FIG. 5 is an example flow diagram of placing a product code and a service code in an electronic shopping cart as per an aspect of an embodiment. A computer-mediated reality system (for example, 110) may be programmed to perform an automated method of selling a product with a contractor service. The automated method performed by the computer-mediated reality system (for example, 110) may comprise electronically communicating to a purchaser device (for example, 130), from the computer-mediated reality system (for example, 110), computer-mediated presentation information (for example, 112) for the product at 510. The automated method performed by the computer-mediated reality system (for example, 110) may comprise electronically receiving at the computer-mediated reality system (for example, 110), from the purchaser device (for example, 130), a selection of the product (for example, 131) at 520. The automated method performed by the computer-mediated reality system (for example, 110) may comprise determining that a selection of the product (for example, 131) has been received The automated method performed by the computer-mediated reality system (for example, 110) may comprise automatically placing a product code (for example, 111) for the product in an electronic shopping cart at 530. The automated method performed by the computer-mediated reality system (for example, 110) may comprise electronically communicating to the purchaser device (for example, 130), from the computer-mediated reality system (for example, 110), computer-mediated offer information (for example, 113) for the contractor service at 540. The automated method performed by the computer-mediated reality system (for example, 110) may comprise electronically receiving at the computer-mediated reality system (for example, 110), from the purchaser device (for example, 130), a selection of the contractor service (for example, 132) at 550. The automated method performed by the computer-mediated reality system (for example, 110) may comprise determining that a selection of the contractor service (for example, 132) has been received. The automated method performed by the computer-mediated reality system (for example, 110) may comprise automatically placing a service code (for example, 151) for the contractor service in the electronic shopping cart, the service code (for example, 151) electronically received at the computer-mediated reality system (for example, 110) from a mapping computer system (for example, 150), the service code (for example, 151) automatically derived by the mapping computing system (for example, 150) programmed to map the product with the contractor service at 560. The automated method performed by the computer-mediated reality system (for example, 110) may comprise electronically completing a shopping cart transaction (for example, 115) in electronic communication with the purchaser device (for example, 130) at 570.

Figure 6:
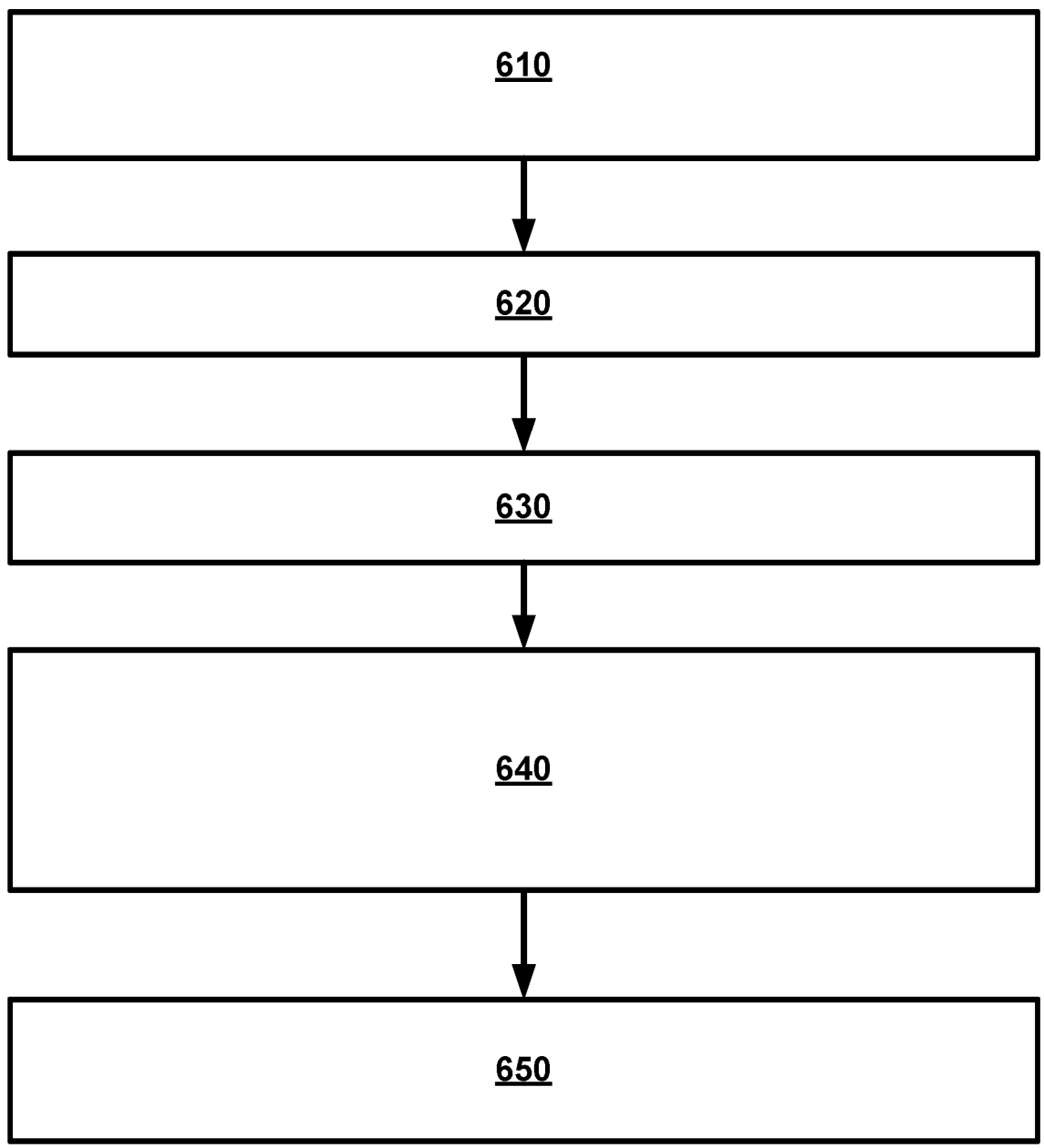
FIG. 6 is an example flow diagram of placing a product code and a service code in an electronic shopping cart as per an aspect of an embodiment.

FIG. 6 is an example flow diagram of placing a product code and a service code in an electronic shopping cart as per an aspect of an embodiment. A computer-mediated reality system (for example, 210) may be programmed to perform an automated method of selling a product with a contractor service. The automated method performed by the computer-mediated reality system (for example, 210) may comprise electronically communicating to a purchaser device (for example, 230), from the computer-mediated reality system (for example, 210), computer-mediated presentation information (for example, 212) for the product and the contractor service at 610. The automated method performed by the computer-mediated reality system (for example, 210) may comprise electronically receiving at the computer-mediated reality system (for example, 210), from the purchaser device (for example, 230), a selection of the product with the contractor service (for example, 233) at 620. The automated method performed by the computer-mediated reality system (for example, 210) may comprise determining that a selection of the product with the contractor service (for example, 233) has been received. The automated method performed by the computer-mediated reality system (for example, 210) may comprise automatically placing a product code (for example, 211) for the product in an electronic shopping cart at 630. The automated method performed by the computer-mediated reality system (for example, 210) may comprise automatically placing a service code (for example, 251) for the contractor service in the electronic shopping cart, the service code (for example, 251) electronically received at the computer-mediated reality system (for example, 210) from a mapping computer system (for example, 250), the service code (for example, 251) automatically derived by the mapping computing system (for example, 250) programmed to map the product with the contractor service at 640. The automated method performed by the computer-mediated reality system (for example, 210) may comprise electronically communicating to the purchaser device (for example, 230), from the computer-mediated reality system (for example, 210), electronic shopping cart information (for example, 214) with a request to complete a purchase of the product and the contractor service at 650.

Figure 7:
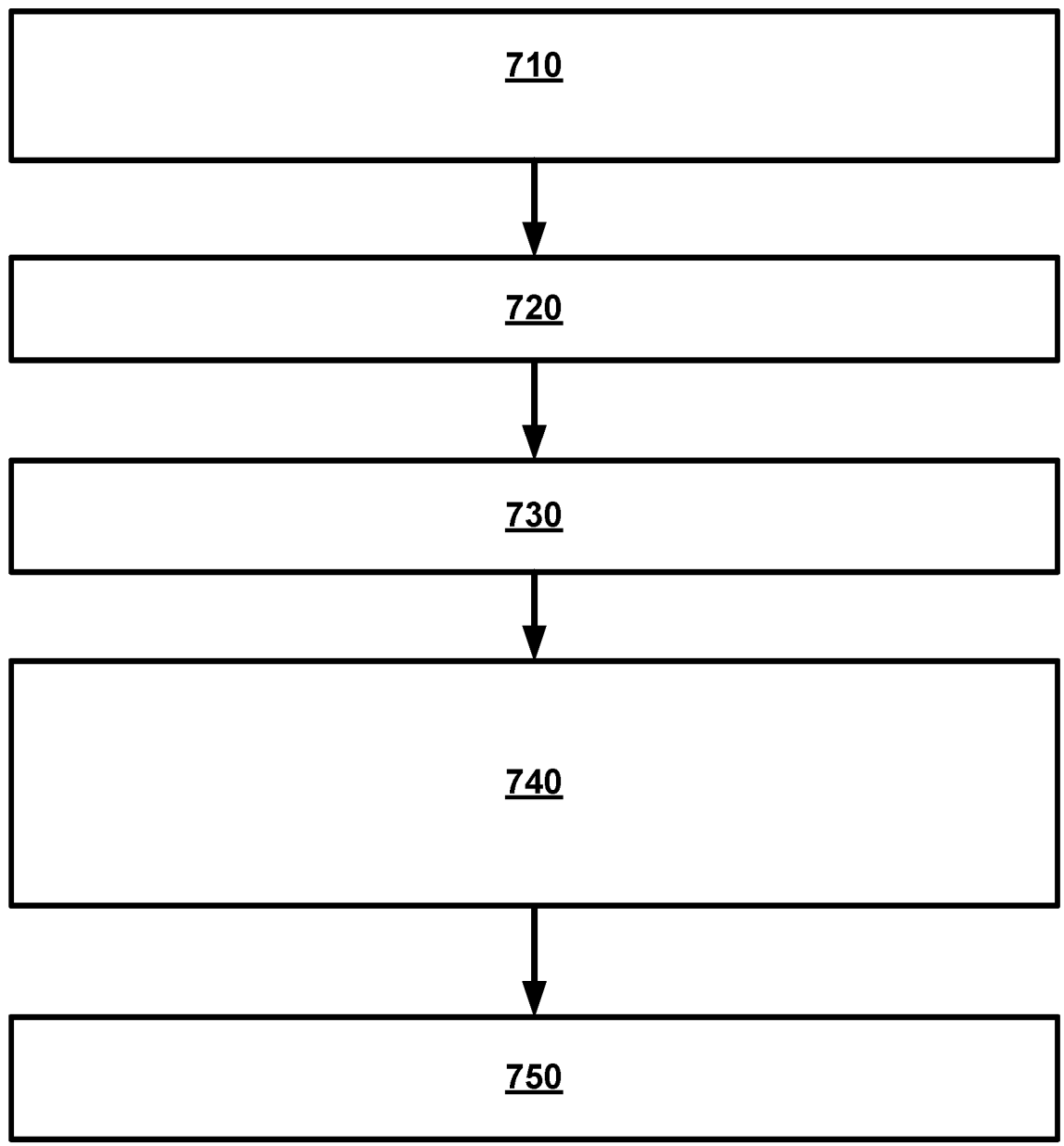
FIG. 7 is an example flow diagram of placing a product code and a service code in an electronic shopping cart as per an aspect of an embodiment.

FIG. 7 is an example flow diagram of placing a product code and a service code in an electronic shopping cart as per an aspect of an embodiment. A computer-mediated reality system (for example, 210) may be programmed to perform an automated method of selling a product with a contractor service. The automated method performed by the computer-mediated reality system (for example, 210) may comprise electronically communicating to a purchaser device (for example, 230), from the computer-mediated reality system (for example, 210), computer-mediated presentation information (for example, 212) for the product and the contractor service at 710. The automated method performed by the computer-mediated reality system (for example, 210) may comprise electronically receiving at the computer-mediated reality system (for example, 210), from the purchaser device (for example, 230), a selection of the product with the contractor service (for example, 233) at 720. The automated method performed by the computer-mediated reality system (for example, 210) may comprise determining that a selection of the product with the contractor service (for example, 233) has been received. The automated method performed by the computer-mediated reality system (for example, 210) may comprise automatically placing a product code (for example, 211) for the product in an electronic shopping cart at 730. The automated method performed by the computer-mediated reality system (for example, 210) may comprise automatically placing a service code (for example, 251) for the contractor service in the electronic shopping cart, the service code (for example, 251) electronically received at the computer-mediated reality system (for example, 210) from a mapping computer system (for example, 250), the service code (for example, 251) automatically derived by the mapping computing system (for example, 250) programmed to map the product with the contractor service at 740. The automated method performed by the computer-mediated reality system (for example, 210) may comprise electronically completing a shopping cart transaction (for example, 215) in electronic communication with the purchaser device (for example, 230) at 750.

Figure 8:
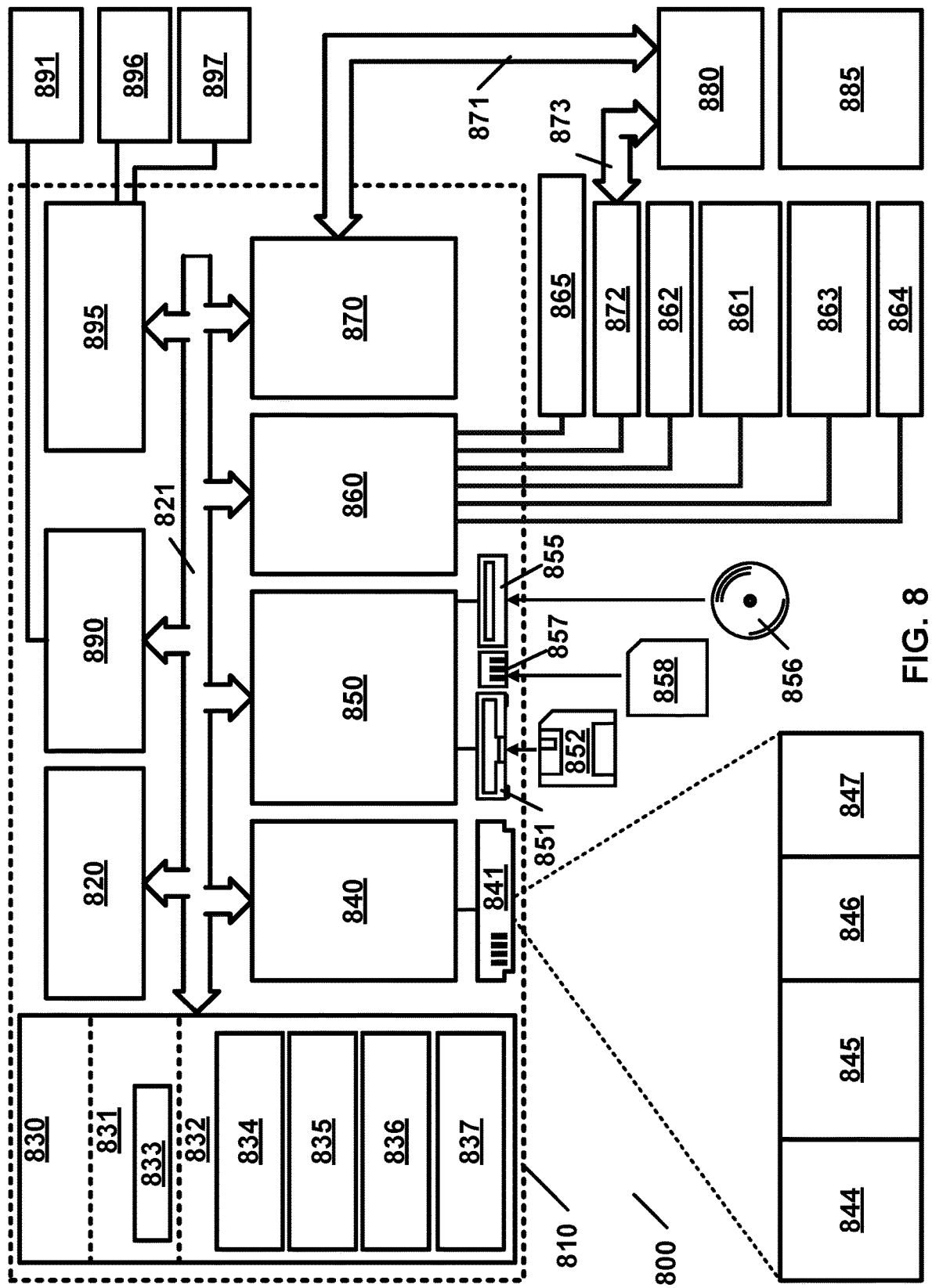
FIG. 8 is a block diagram of a computing environment in which aspects of embodiments of the present invention may be practiced.

FIG. 8 is a block diagram of a computing environment in which aspects of embodiments of the present invention may be practiced. The computing environment may comprise computing device 810. Components of computing device 810 may include, but are not limited to, a processing unit 820, a system memory 830, and a system bus 821 that couples various system components including the system memory 830 to the processing unit 820.

Computing device 810 may comprise a variety of computer readable media. Computer readable media may be available media accessible by computing device 810 and may include both volatile and nonvolatile media, removable and non-removable media. By way of example, and not limitation, computer readable media may comprise computer storage media and communication media. Computer storage media may comprise both volatile and nonvolatile, removable and non-removable media implemented in a method or technology for storage of data such as computer readable instructions, data structures, program modules, other data, combinations thereof, and/or the like. Computer storage media may comprise, but is not limited to, random access memory (RAM), read-only memory (ROM), electrically erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, and/or any other medium which may be employed to store data and which may be accessed by computer 810. Communication media may comprise computer readable instructions, data structures, program modules and/or other data in a modulated data signal such as a carrier wave and/or other transport mechanism and may comprise data delivery media. The term "modulated data signal" means a signal that has one or more of its characteristics set or changed in such a manner as to encode data in the signal. By way of example, and not limitation, communication media includes wired media such as a wired network or direct-wired connection, and wireless media such as acoustic, radio frequency (RF), infrared and other wireless media. Combinations of any of the above may also be included within the scope of computer readable media.

The system memory 830 may comprise computer storage media in the form of volatile and/or nonvolatile memory such as ROM 831 and RAM 832. A basic input/output system 833 (BIOS), containing the basic routines that help to transfer data between elements within computer 810, such as during start-up, may be stored in ROM 831. RAM 832 may comprise data and/or program modules that may be accessible to and/or presently being operated on by processing unit 820. By way of example, and not limitation, FIG. 8 illustrates operating system 834, application programs 835, other program modules 836, and program data 837.

The computing device 810 may also comprise other removable/non-removable volatile/nonvolatile computer storage media. By way of example only, FIG. 8 illustrates a hard disk drive 841 that may read from or write to non-removable, nonvolatile magnetic media, a magnetic disk drive 851 that may read from or write to a removable, nonvolatile magnetic disk 852, a flash drive reader 857 that may read flash drive 858, and an optical disk drive 855 that may read from or write to a removable, nonvolatile optical disk 856 such as a CD ROM or other optical media. Other removable/non-removable, volatile/nonvolatile computer storage media that may be used in the operating environment include, but are not limited to, magnetic tape cassettes, flash memory cards, digital versatile disks, digital video tape, solid state RAM, solid state ROM, and the like. The hard disk drive 841 may be connected to the system bus 821 through a non-removable memory interface such as interface 840, and magnetic disk drive 851 and optical disk drive 855 may be connected to the system bus 821 by a removable memory interface, such as interface 850.

The drives and their associated computer storage media discussed above and illustrated in FIG. 8 provide storage of computer readable instructions, data structures, program modules and other data for the computer 810. In FIG. 8, for example, hard disk drive 841 is illustrated as storing operating system 844, application programs 845, program data 847, and other program modules 846. Additionally, for example, non-volatile memory may include instructions for presenting images on a display 891 of computing device 800 and/or the like. Similarly, non-volatile memory may comprise instructions for causing the presentation of images on the display of a remote computing device 880 and/or the like. Display 891 and touch input 865 may be integrated into the same device.

A user may enter commands and data into computing device 810 through input devices such as a touch input device 865, a keyboard 862, a microphone 863, a camera 864, and a pointing device 861, such as a mouse, trackball or touch pad. These and other input devices may be connected to the processing unit 820 through interface 860 coupled to system bus 821, but may be connected by other interface and bus structures, such as a parallel port, game port or a universal serial bus (USB). A display 891 or other type of display device may be connected to the system bus 821 via an interface, such as a video interface 890. Other devices, such as, for example, speakers 897 and printer 896 may be connected to the system via output interface 895.

The computing device 810 may be operated in a networked environment using logical connections to one or more remote computers, such as a remote computer 880. Remote computer 880 may be a personal computer, a hand-held device, a server, a router, a network PC, a peer device or other common network node, and typically includes many or all of the elements described above relative to the computing device 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computing device 810 is connected to the LAN 871 through a network interface or adapter 870. When used in a WAN networking environment, the computing device 810 may comprise a modem 872 or other means for establishing communications over the WAN 873, such as the Internet. The modem 872, which may be internal or external, may be connected to the system bus 881 via interface 860, or other appropriate mechanism. The modem 872 may be wired or wireless. Examples of wireless devices may comprise, but are not limited to: Wi-Fi and Bluetooth. In a networked environment, program modules depicted relative to the computing device 810, or portions thereof, may be stored in the remote memory storage device. By way of example, and not limitation, FIG. 8 illustrates remote application programs 885 as residing on remote computer 880. It will be appreciated that the network connections shown are presented as examples only and other means of establishing a communications link between the computers may be used.

According to an embodiment, a computer-mediated reality system may be coupled to a global computer network. The computer-mediated reality system may be programmed to perform a method of selling a product with a contractor service associated with the product. The method performed by the computer-mediated reality system may comprise electronically communicating to a purchaser device, from the computer-mediated reality system, computer-mediated presentation information for the product. The method performed by the computer-mediated reality system may comprise electronically receiving at the computer-mediated reality system, from the purchaser device, a selection of the product. The method performed by the computer-mediated reality system may comprise automatically placing a product code for the product in an electronic shopping cart. The method performed by the computer-mediated reality system may comprise electronically communicating to the purchaser device, from the computer-mediated reality system, computer-mediated offer information for the contractor service. The method performed by the computer-mediated reality system may comprise electronically receiving at the computer-mediated reality system, from the purchaser device, a selection of the contractor service. The method performed by the computer-mediated reality system may comprise automatically placing a service code for the contractor service in the electronic shopping cart. The service code may be electronically received at the computer-mediated reality system from a mapping computer system. The service code may be automatically derived by the mapping computing system programmed to map the product with the contractor service. The method performed by the computer-mediated reality system may comprise electronically communicating to the purchaser device, from the computer-mediated reality system, electronic shopping cart information with a request to complete a purchase of the product and the contractor service.

According to an embodiment, a computer-mediated reality system may be coupled to a global computer network. The computer-mediated reality may be programmed to perform a method of selling a product with a contractor service associated with the product. The method performed by the computer-mediated reality system may comprise electronically communicating computer-mediated presentation information for the product. The method performed by the computer-mediated reality system may comprise electronically receiving a selection of the product. The method performed by the computer-mediated reality system may comprise automatically placing a product code for the product in an electronic shopping cart. The method performed by the computer-mediated reality system may comprise electronically communicating computer-mediated offer information for the contractor service. The method performed by the computer-mediated reality system may comprise electronically receiving a selection of the contractor service. The method performed by the computer-mediated reality system may comprise automatically placing a service code for the contractor service in the electronic shopping cart. The method performed by the computer-mediated reality system may comprise electronically communicating electronic shopping cart information with a request to complete a purchase of the product and the contractor service.

According to an embodiment, a computer-mediated reality system may be coupled to a global computer network and may be programmed to perform a method of selling a product with a contractor service associated with the product. The method performed by the computer-mediated reality system may comprise electronically communicating to a purchaser device, from the computer-mediated reality system, computer-mediated presentation information for the product. The method performed by the computer-mediated reality system may comprise electronically receiving at the computer-mediated reality system, from the purchaser device, a selection of the product. The method performed by the computer-mediated reality system may comprise automatically placing a product code for the product in an electronic shopping cart. The method performed by the computer-mediated reality system may comprise electronically communicating to a purchaser device, from the computer-mediated reality system, computer-mediated offer information for the contractor service. The method performed by the computer-mediated reality system may comprise electronically receiving at the computer-mediated reality system, from the purchaser device, a selection of the contractor service. The method performed by the computer-mediated reality system may comprise automatically placing a service code for the contractor service in the electronic shopping cart. The service code may be electronically received at the computer-mediated reality system from a mapping computer system. The service code may be automatically derived by the mapping computing system. The mapping computing system may be programmed to map the product with the contractor service. The method performed by the computer-mediated reality system may comprise completing an electronic shopping cart transaction in electronic communication with the purchaser device.

According to an embodiment, a computer-mediated reality system may be coupled to a global computer network. The computer-mediated reality system may be programmed to perform a method of selling a product with a contractor service associated with the product. The method performed by the computer-mediated reality system may comprise electronically communicating computer-mediated presentation information for the product. The method performed by the computer-mediated reality system may comprise electronically receiving a selection of the product. The method performed by the computer-mediated reality system may comprise automatically placing a product code for the product in an electronic shopping cart. The method performed by the computer-mediated reality system may comprise electronically communicating computer-mediated offer information for the contractor service. The method performed by the computer-mediated reality system may comprise electronically receiving a selection of the contractor service. The method performed by the computer-mediated reality system may comprise automatically placing a service code for the contractor service in the electronic shopping cart. The method performed by the computer-mediated reality system may comprise completing an electronic shopping cart transaction.

According to an embodiment, a computer-mediated reality system may be coupled to a global computer network. The computer-mediated reality system may be programmed to perform a method of selling a product with a contractor service associated with the product. The method performed by the computer-mediated reality system may comprise electronically communicating to a purchaser device, from the computer-mediated reality system, computer-mediated presentation information for the product and the contractor service. The method performed by the computer-mediated reality system may comprise electronically receiving at the computer-mediated reality system, from the purchaser device, a selection of the product with the contractor service. The method performed by the computer-mediated reality system may comprise automatically placing a product code for the product in an electronic shopping cart. The method performed by the computer-mediated reality system may comprise automatically placing a service code for the contractor service in the electronic shopping cart. The service code may be electronically received at the computer-mediated reality system from a mapping computer system. The service code may be automatically derived by the mapping computing system. The mapping computing system may be programmed to map the product with the contractor service. The method performed by the computer-mediated reality system may comprise electronically communicating to the purchaser device, from the computer-mediated reality system, electronic shopping cart information with a request to complete a purchase of the product and the contractor service.

According to an embodiment, a computer-mediated reality system may be coupled to a global computer network. The computer-mediated reality system may be programmed to perform a method of selling a product with a contractor service associated with the product. The method performed by the computer-mediated reality system may comprise electronically communicating computer-mediated presentation information for the product and the contractor service. The method performed by the computer-mediated reality system may comprise electronically receiving a selection of the product with the contractor service. The method performed by the computer-mediated reality system may comprise automatically placing a product code for the product in an electronic shopping cart. The method performed by the computer-mediated reality system may comprise automatically placing a service code for the contractor service in the electronic shopping cart. The method performed by the computer-mediated reality system may comprise electronically communicating electronic shopping cart information with a request to complete a purchase of the product and the contractor service.

According to an embodiment, a computer-mediated reality system may be coupled to a global computer network. The computer-mediated reality system may be programmed to perform a method of selling a product with a contractor service associated with the product. The method performed by the computer-mediated reality system may comprise electronically communicating to a purchaser device, from the computer-mediated reality system, computer-mediated presentation information for the product and the contractor service. The method performed by the computer-mediated reality system may comprise electronically receiving at the computer-mediated reality system, from the purchaser device, a selection of the product with the contractor service. The method performed by the computer-mediated reality system may comprise automatically placing a product code for the product in an electronic shopping cart. The method performed by the computer-mediated reality system may comprise automatically placing a service code for the contractor service in the electronic shopping cart. The service code may be electronically received at the computer-mediated reality system from a mapping computer system. The service code may be automatically derived by the mapping computing system. The mapping computing system may be programmed to map the product with the contractor service. The method performed by the computer-mediated reality system may comprise completing an electronic shopping cart transaction in electronic communication with the purchaser device.

According to an embodiment, a computer-mediated reality system may be coupled to a global computer network. The computer-mediated reality system may be programmed to perform a method of selling a product with a contractor service associated with the product. The method performed by the computer-mediated reality system may comprise electronically communicating computer-mediated presentation information for the product and the contractor service. The method performed by the computer-mediated reality system may comprise electronically receiving a selection of the product with the contractor service. The method performed by the computer-mediated reality system may comprise automatically placing a product code for the product in an electronic shopping cart. The method performed by the computer-mediated reality system may comprise automatically placing a service code for the contractor service in the electronic shopping cart. The method performed by the computer-mediated reality system may comprise completing an electronic shopping cart transaction.

According to an embodiment, a tangible, non-transitory data storage medium may comprise indicia of instructions for a computer-mediated reality system to perform an automated method of selling a product with a contractor service associated with the product. The computer-mediated reality system may be coupled to a global computer network The computer-mediated reality system may have access to a data storage device. The automated method performed according to the instructions may comprise electronically communicating to a purchaser device, from the computer-mediated reality system, computer-mediated presentation information for the product. The automated method performed according to the instructions may comprise electronically receiving at the computer-mediated reality system, from the purchaser device, a selection of the product. The automated method performed according to the instructions may comprise automatically placing a product code for the product in an electronic shopping cart. The automated method performed according to the instructions may comprise electronically communicating to the purchaser device, from the computer-mediated reality system, computer-mediated offer information for the contractor service. The automated method performed according to the instructions may comprise electronically receiving at the computer-mediated reality system, from the purchaser device, a selection of the contractor service. The automated method performed according to the instructions may comprise automatically placing a service code for the contractor service in the electronic shopping cart. The service code may be electronically received at the computer-mediated reality system from a mapping computer system. The service code may be automatically derived by the mapping computing system. The mapping computing system may be programmed to map the product with the contractor service. The automated method performed according to the instructions may comprise electronically communicating to the purchaser device, from the computer-mediated reality system, electronic shopping cart information with a request to complete a purchase of the product and the contractor service.

According to an embodiment, a tangible, non-transitory data storage medium may comprise indicia of instructions for a computer-mediated reality system to perform an automated method of selling a product with a contractor service associated with the product. The computer-mediated reality system may be coupled to a global computer network. The computer-mediated reality system may have access to a data storage device. The automated method performed according to the instructions may comprise electronically communicating computer-mediated presentation information for the product. The automated method performed according to the instructions may comprise electronically receiving a selection of the product. The automated method performed according to the instructions may comprise automatically placing a product code for the product in an electronic shopping cart. The automated method performed according to the instructions may comprise electronically communicating computer-mediated offer information for the contractor service. The automated method performed according to the instructions may comprise electronically receiving a selection of the contractor service. The automated method performed according to the instructions may comprise automatically placing a service code for the contractor service in the electronic shopping cart. The automated method performed according to the instructions may comprise electronically communicating electronic shopping cart information with a request to complete a purchase of the product and the contractor service.

According to an embodiment, a tangible, non-transitory data storage medium may comprise indicia of instructions for a computer-mediated reality system to perform an automated method of selling a product with a contractor service associated with the product. The computer-mediated reality system may be coupled to a global computer network. The computer-mediated reality system may have access to a data storage device. The automated method performed according to the instructions may comprise electronically communicating to a purchaser device, from the computer-mediated reality system, computer-mediated presentation information for the product. The automated method performed according to the instructions may comprise electronically receiving at the computer-mediated reality system, from the purchaser device, a selection of the product. The automated method performed according to the instructions may comprise automatically placing a product code for the product in an electronic shopping cart. The automated method performed according to the instructions may comprise electronically communicating to a purchaser device, from the computer-mediated reality system, computer-mediated offer information for the contractor service. The automated method performed according to the instructions may comprise electronically receiving at the computer-mediated reality system, from the purchaser device, a selection of the contractor service. The automated method performed according to the instructions may comprise automatically placing a service code for the contractor service in the electronic shopping cart. The service code may be electronically received at the computer-mediated reality system from a mapping computer system. The service code may be automatically derived by the mapping computing system. The mapping computing system may be programmed to map the product with the contractor service. The automated method performed according to the instructions may comprise completing an electronic shopping cart transaction in electronic communication with the purchaser device.

According to an embodiment, a tangible, non-transitory data storage medium may comprise indicia of instructions for a computer-mediated reality system to perform an automated method of selling a product with a contractor service associated with the product. The computer-mediated reality system may be coupled to a global computer network. The computer-mediated reality system may have access to a data storage device. The automated method performed according to the instructions may comprise electronically communicating computer-mediated presentation information for the product. The automated method performed according to the instructions may comprise electronically receiving a selection of the product. The automated method performed according to the instructions may comprise automatically placing a product code for the product in an electronic shopping cart. The automated method performed according to the instructions may comprise electronically communicating computer-mediated offer information for the contractor service. The automated method performed according to the instructions may comprise electronically receiving a selection of the contractor service. The automated method performed according to the instructions may comprise automatically placing a service code for the contractor service in the electronic shopping cart. The automated method performed according to the instructions may comprise completing an electronic shopping cart transaction.

According to an embodiment, a tangible, non-transitory data storage medium may comprise indicia of instructions for a computer-mediated reality system to perform an automated method of selling a product with a contractor service associated with the product. The computer-mediated reality system may be coupled to a global computer network. The computer-mediated reality system may have access to a data storage device. The automated method performed according to the instructions may comprise electronically communicating to a purchaser device, from the computer-mediated reality system, computer-mediated presentation information for the product and the contractor service. The automated method performed according to the instructions may comprise electronically receiving at the computer-mediated reality system, from the purchaser device, a selection of the product with the contractor service. The automated method performed according to the instructions may comprise automatically placing a product code for the product in an electronic shopping cart. The automated method performed according to the instructions may comprise automatically placing a service code for the contractor service in the electronic shopping cart. The service code may be electronically received at the computer-mediated reality system from a mapping computer system. The service code may be automatically derived by the mapping computing system. The mapping computing system may be programmed to map the product with the contractor service. The automated method performed according to the instructions may comprise electronically communicating to the purchaser device, from the computer-mediated reality system, electronic shopping cart information with a request to complete a purchase of the product and the contractor service.

According to an embodiment, a tangible, non-transitory data storage medium may comprise indicia of instructions for a computer-mediated reality system to perform an automated method of selling a product with a contractor service associated with the product. The computer-mediated reality system may be coupled to a global computer network. The computer-mediated reality system may have access to a data storage device. The automated method performed according to the instructions may comprise electronically communicating computer-mediated presentation information for the product and the contractor service. The automated method performed according to the instructions may comprise electronically receiving a selection of the product with the contractor service. The automated method performed according to the instructions may comprise automatically placing a product code for the product in an electronic shopping cart. The automated method performed according to the instructions may comprise automatically placing a service code for the contractor service in the electronic shopping cart. The automated method performed according to the instructions may comprise electronically communicating electronic shopping cart information with a request to complete a purchase of the product and the contractor service.

According to an embodiment, a tangible, non-transitory data storage medium may comprise indicia of instructions for a computer-mediated reality system to perform an automated method of selling a product with a contractor service associated with the product. The computer-mediated reality system may be coupled to a global computer network. The computer-mediated reality system may have access to a data storage device. The automated method performed according to the instructions may comprise electronically communicating to a purchaser device, from the computer-mediated reality system, computer-mediated presentation information for the product and the contractor service. The automated method performed according to the instructions may comprise electronically receiving at the computer-mediated reality system, from the purchaser device, a selection of the product with the contractor service. The automated method performed according to the instructions may comprise automatically placing a product code for the product in an electronic shopping cart. The automated method performed according to the instructions may comprise automatically placing a service code for the contractor service in the electronic shopping cart. The service code may be electronically received at the computer-mediated reality system from a mapping computer system. The service code may be automatically derived by the mapping computing system. The mapping computing system may be programmed to map the product with the contractor service. The automated method performed according to the instructions may comprise completing an electronic shopping cart transaction in electronic communication with the purchaser device.

According to an embodiment, a tangible, non-transitory data storage medium may comprise indicia of instructions for a computer-mediated reality system to perform an automated method of selling a product with a contractor service associated with the product. The computer-mediated reality system may be coupled to a global computer network. The computer-mediated reality system may have access to a data storage device. The automated method performed according to the instructions may comprise electronically communicating computer-mediated presentation information for the product and the contractor service. The automated method performed according to the instructions may comprise electronically receiving a selection of the product with the contractor service. The automated method performed according to the instructions may comprise automatically placing a product code for the product in an electronic shopping cart. The automated method performed according to the instructions may comprise automatically placing a service code for the contractor service in the electronic shopping cart. The automated method performed according to the instructions may comprise completing an electronic shopping cart transaction.

According to an embodiment, a selection of a product and a selection of a contractor service may be made through employment of at least one of: a camera, a biometric device, an EyeTap, a microphone, and a touchscreen.

According to an embodiment, a method performed by a computer-mediated reality system may comprise electronically communicating to a purchaser device, from the computer-mediated reality system, computer-mediated offer information for a product with a contractor service.

According to an embodiment, a selection of a product with a contractor service may be made through employment of at least one of: a camera, a biometric device, an EyeTap, a microphone, and a touchscreen.

According to an embodiment, a method performed by a computer-mediated reality system may comprise electronically completing a purchase through employment of a mobile payment system.

According to an embodiment, a method performed by a computer-mediated reality system may comprise electronically completing a electronic shopping cart transaction through employment of a mobile payment system.

According to an embodiment, a computer-mediated presentation information may comprise at least one of: an augmented reality presentation component, and a virtual reality presentation component.

According to an embodiment, a computer-mediated offer information may comprise at least one of: an augmented reality presentation component, and a virtual reality presentation component.

According to an embodiment, a method performed by a computer-mediated reality system may comprise electronically receiving image data captured by a purchaser device. The image data may comprise an item.

According to an embodiment, a method performed by a computer-mediated reality system may comprise automatically identifying a potential product from image data.

According to an embodiment, a method performed by a computer-mediated reality system may comprise automatically correlating a potential product with a product.

According to an embodiment, a method performed by a computer-mediated reality system may comprise automatically retrieving a product code for a product.

According to an embodiment, a product code may represent at least one of: a product, a plurality of products, and a set of products.

According to an embodiment, at least one of the following may comprise a rental:

a sale, and a purchase.

According to an embodiment, a contractor service may comprise at least one of: a measurement, assembly of a product, an installation, a delivery, an inspection, a repair, a replacement, a warranty certification, a repair under warranty, and a replacement under warranty.

According to an embodiment, a service code may correspond to a service price. The service price may be based on location data. The location data may be electronically communicated from a purchaser device.

According to an embodiment, a service code may correspond to a service price. The service price may be based on location information of a purchaser. The service price may be based on location information of a purchaser device. The location information may be communicated to a computer-mediated reality system from a mobile payment system.

According to an embodiment, a method performed by a computer-mediated reality system may comprise electronically receiving purchaser data for a purchaser.

According to an embodiment, a method performed by a computer-mediated reality system may comprise electronically communicating first data to a purchaser device. The first data may indicate product data and contractor service data to a purchaser employing the purchaser device.

According to an embodiment, a method performed by a computer-mediated reality system may comprise electronically communicating second data to a purchaser device. The second data may indicate electronic shopping cart data to a purchaser employing the purchaser device.

According to an embodiment, a method performed by a computer-mediated reality system may comprise electronically communicating third data to a purchaser device. The third data may indicate terms of service to a purchaser employing the purchaser device.

According to an embodiment, a method performed by a computer-mediated reality system may comprise electronically communicating terms of service to a purchaser device. The method performed by the computer-mediated reality system may comprise electronically receiving an acceptance of the terms of service from the purchaser device. The method performed by the computer-mediated reality system may comprise electronically communicating the acceptance to a service processing computer system.

According to an embodiment, a method performed by a computer-mediated reality system may comprise automatically removing a service code from an electronic shopping cart based on an invalidation.

According to an embodiment, a method performed by a computer-mediated reality system may comprise electronically communicating an electronic service request to a service processing computer system. The electronic service request may comprise at least one of: purchaser data, product data, and service data.

According to an embodiment, a method performed by a computer-mediated reality system may comprise electronically communicating a service order confirmation to a purchaser device.

According to an embodiment, a method performed by a computer-mediated reality system may comprise electronically communicating a consumer feedback survey to a purchaser device.

According to an embodiment, a method performed by a computer-mediated reality system may comprise electronically receiving consumer feedback survey data from a purchaser device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

In this specification, "a" and "an" and similar phrases are to be interpreted as "at least one" and "one or more." References to "a", "an", and "one" are not to be interpreted as "only one". In this specification, the term "may" is to be interpreted as "may, for example." In other words, the term "may" is indicative that the phrase following the term "may" is an example of one of a multitude of suitable possibilities that may, or may not, be employed to one or more of the various embodiments. In this specification, the phrase "based on" is indicative that the phrase following the term "based on" is an example of one of a multitude of suitable possibilities that may, or may not, be employed to one or more of the various embodiments. References to "an" embodiment in this disclosure are not necessarily to the same embodiment.

Many of the elements described in the disclosed embodiments may be implemented as modules. A module is defined here as an isolatable element that performs a defined function and has a defined interface to other elements. The modules described in this disclosure may be implemented in hardware, a combination of hardware and software, firmware, wetware (that is hardware with a biological element) or a combination thereof, all of which are behaviorally equivalent. For example, modules may be implemented using computer hardware in combination with software routine(s) written in a computer language (Java, HTML, XML, PHP, Python, ActionScript, JavaScript, Ruby, Prolog, SQL, VBScript, Visual Basic, Perl, C, C++, Objective-C or the like). Additionally, it may be possible to implement modules using physical hardware that incorporates discrete or programmable analog, digital and/or quantum hardware. Examples of programmable hardware include: computers, microcontrollers, microprocessors, application-specific integrated circuits (ASICs), field programmable gate arrays (FPGAs), and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies may be used in combination to achieve the result of a functional module.

Some embodiments may employ processing hardware. Processing hardware may include one or more processors, computer equipment, embedded system, machines and/or the like. The processing hardware may be configured to execute instructions. The instructions may be stored on a machine-readable medium. According to some embodiments, the machine-readable medium (for example, automated data medium) may be a medium configured to store data in a machine-readable format that may be accessed by an automated sensing device. Examples of machine-readable media include: magnetic disks, cards, tapes, and drums, flash memory, memory cards, electrically erasable programmable read-only memory (EEPROM), solid state drives, optical disks, barcodes, magnetic ink characters, and/or the like.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example, purposes computer systems have been described as including server(s), computer(s), mobile device(s), and/or wearable device(s). However, one skilled in the art will recognize that the relationships between server(s), computer(s), mobile device(s), and/or wearable device(s) may vary from a traditional server/device relationship over a global network such as the Internet. For example, a server may be collective based: portable equipment, broadcast equipment, virtual, application(s) distributed over a broad combination of computing sources, part of a cloud, and/or the like. Similarly, for example, a mobile device may be a user based client, portable equipment, broadcast equipment, virtual, application(s) distributed over a broad combination of computing sources, part of a cloud, integrated with at least one wearable device, and/or the like. Similarly, at least one wearable device may be configured to operate as a mobile device. Additionally, it should be noted that, for example, purposes, several of the various embodiments may employ instructions operating in conjunction with hardware devices. However, one skilled in the art will recognize that many various languages and frameworks may be employed to build and use embodiments of the present disclosure. For example, languages/frameworks may be based upon Java, HTML, XML, PHP, Python, ActionScript, JavaScript, Ruby, Prolog, SQL, VBScript, Visual Basic, Perl, C, C++, Objective-C combinations thereof, and/or the like.

In this specification, various embodiments are disclosed. Limitations, features, and/or elements from the disclosed example embodiments may be combined to create further embodiments within the scope of the disclosure.

In addition, it should be understood that any figures that highlight any functionality and/or advantages, are presented for example, purposes only. The disclosed architecture is sufficiently flexible and configurable, such that it may be utilized in ways other than that shown. For example, the steps listed in any flowchart may be re-ordered or only optionally used in some embodiments.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A computer-mediated reality system coupled to a global computer network and programmed to perform a method of selling a product with a contractor service associated with the product, the method performed by the computer-mediated reality system comprising:
   a) electronically communicating to a purchaser device, from the computer-mediated reality system, computer-mediated presentation information for the product;
   b) electronically receiving at the computer-mediated reality system, from the purchaser device, a selection of the product;
   c) automatically placing a product code for the product in an electronic shopping cart;
   d) electronically communicating to the purchaser device, from the computer-mediated reality system, computer-mediated offer information for the contractor service;
   e) electronically receiving at the computer-mediated reality system, from the purchaser device, a selection of the contractor service;
   f) automatically placing a service code for the contractor service in the electronic shopping cart, the service code electronically received at the computer-mediated reality system from a mapping computer system, the service code automatically derived by the mapping computing system programmed to map the product with the contractor service; and
   g) electronically communicating to the purchaser device, from the computer-mediated reality system, electronic shopping cart information with a request to complete a purchase of the product and the contractor service.

2. The system according to claim 1, wherein the selection of the product and the selection of the contractor service is made through employment of at least one of the following:
   a) a camera;
   b) a biometric device;
   c) an EyeTap;
   d) a microphone; and
   e) a touchscreen.

3. The system according to claim 1, the method performed by the computer-mediated reality system further comprising electronically completing the purchase through employment of a mobile payment system.

4. The system according to claim 1, wherein the computer-mediated presentation information comprises at least one of the following:
   a) an augmented reality presentation component; and
   b) a virtual reality presentation component.

5. The system according to claim 1, wherein the computer-mediated offer information comprises at least one of the following:
 a) an augmented reality presentation component; and
 b) a virtual reality presentation component.

6. The system according to claim 1, the method performed by the computer-mediated reality system further comprising electronically receiving image data captured by the purchaser device, the image data comprising an item.

7. The system according to claim 6, the method performed by the computer-mediated reality system further comprising automatically identifying a potential product from the image data.

8. The system according to claim 7, the method performed by the computer-mediated reality system further comprising automatically correlating the potential product with the product.

9. The system according to claim 8, the method performed by the computer-mediated reality system further comprising automatically retrieving the product code for the product.

10. The system according to claim 1, wherein the product code represents at least one of:
 a) a product;
 b) a plurality of products; and
 c) a set of products.

11. The system according to claim 1, wherein at least one of the following comprises a rental:
 a) a sale; and
 b) a purchase.

12. The system according to claim 1, wherein the contractor service comprises at least one of:
 a) a measurement;
 b) assembly of the product;
 c) an installation;
 d) a delivery;
 e) an inspection;
 f) a repair;
 g) a replacement;
 h) a warranty certification;
 i) a repair under warranty; and
 j) a replacement under warranty.

13. The system according to claim 1, wherein the service code corresponds to a service price, the service price based on location data, the location data electronically communicated from the purchaser device.

14. The system according to claim 1, wherein the service code corresponds to a service price, the service price based on location information of a purchaser, the location information communicated to the computer-mediated reality system from a mobile payment system.

15. The system according to claim 1, the method performed by the computer-mediated reality system further comprising electronically receiving purchaser data for a purchaser.

16. The system according to claim 1, the method performed by the computer-mediated reality system further comprising electronically communicating first data to the purchaser device, the first data indicating product data and contractor service data to a purchaser employing the purchaser device.

17. The system according to claim 1, the method performed by the computer-mediated reality system further comprising electronically communicating second data to the purchaser device, the second data indicating electronic shopping cart data to a purchaser employing the purchaser device.

18. The system according to claim 1, the method performed by the computer-mediated reality system further comprising electronically communicating third data to the purchaser device, the third data indicating terms of service to a purchaser employing the purchaser device.

19. The system according to claim 1, the method performed by the computer-mediated reality system further comprising:
 a) electronically communicating terms of service to a purchaser device;
 b) electronically receiving an acceptance of the terms of service from the purchaser device; and
 c) electronically communicating the acceptance to a service processing computer system.

20. The system according to claim 1, the method performed by the computer-mediated reality system further comprising automatically removing the service code from the electronic shopping cart based on an invalidation.

21. The system according to claim 1, the method performed by the computer-mediated reality system further comprising electronically communicating an electronic service request to a service processing computer system, the electronic service request comprising at least one of:
 a) purchaser data;
 b) product data; and
 c) service data.

22. The system according to claim 1, the method performed by the computer-mediated reality system further comprising electronically communicating a service order confirmation to a purchaser device.

23. The system according to claim 1, the method performed by the computer-mediated reality system further comprising electronically communicating a consumer feedback survey to a purchaser device.

24. The system according to claim 23, the method performed by the computer-mediated reality system further comprising electronically receiving consumer feedback survey data from a purchaser device.

25. A tangible, non-transitory data storage medium comprising indicia of instructions for a computer-mediated reality system to perform an automated method of selling a product with a contractor service associated with the product, wherein the computer-mediated reality system is coupled to a global computer network with access to a data storage device, the automated method performed according to the instructions comprising:
 a) electronically communicating to a purchaser device, from the computer-mediated reality system, computer-mediated presentation information for the product;
 b) electronically receiving at the computer-mediated reality system, from the purchaser device, a selection of the product;
 c) automatically placing a product code for the product in an electronic shopping cart;
 d) electronically communicating to the purchaser device, from the computer-mediated reality system, computer-mediated offer information for the contractor service;
 e) electronically receiving at the computer-mediated reality system, from the purchaser device, a selection of the contractor service;
 f) automatically placing a service code for the contractor service in the electronic shopping cart, the service code electronically received at the computer-mediated reality system from a mapping computer system, the service code automatically derived by the mapping computing system programmed to map the product with the contractor service; and g) electronically communicating to the purchaser device, from the computer-mediated reality system, electronic shopping cart information with a request to complete a purchase of the product and the contractor service.

\* \* \* \* \*